(12) United States Patent
Moon et al.

(10) Patent No.: US 12,490,214 B2
(45) Date of Patent: Dec. 2, 2025

(54) METHOD AND DEVICE FOR DELIVERING TIME-SENSITIVE NETWORKING SYNCHRONIZATION INFORMATION IN MOBILE COMMUNICATION SYSTEM

(71) Applicant: Samsung Electronics Co., Ltd., Suwon-si (KR)

(72) Inventors: Sangjun Moon, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/442,708

(22) Filed: Feb. 15, 2024

(65) Prior Publication Data

US 2024/0188011 A1 Jun. 6, 2024

Related U.S. Application Data

(63) Continuation of application No. 17/786,165, filed as application No. PCT/KR2020/018975 on Dec. 23, 2020, now Pat. No. 11,930,464.

(30) Foreign Application Priority Data

Jan. 6, 2020 (KR) .................. 10-2020-0001736
Jan. 15, 2020 (KR) .................. 10-2020-0005658

(51) Int. Cl.
*H04W 56/00* (2009.01)
*H04J 3/06* (2006.01)
(Continued)

(52) U.S. Cl.
CPC ....... *H04W 56/0015* (2013.01); *H04J 3/0667* (2013.01); *H04J 3/0673* (2013.01); *H04L 41/0894* (2022.05); *H04L 43/0852* (2013.01)

(58) Field of Classification Search
None
See application file for complete search history.

(56) References Cited

U.S. PATENT DOCUMENTS 9,882,823 B2    1/2018  Pannell
11,930,464 B2 *  3/2024  Moon ................. H04L 41/0894
(Continued)

FOREIGN PATENT DOCUMENTS

EP    3 823 324 A1    5/2021
EP    3 861 805 B1    8/2021
(Continued)

OTHER PUBLICATIONS

ZTE, 'Discussion on time conversion between TSN clock and 5GS clock', S2-1911909, SA WG2 Meeting #S2-136, Reno, Nevada, USA, Nov. 8, 2019.
(Continued)

*Primary Examiner* — Anh Vu H Ly
(74) *Attorney, Agent, or Firm* — Jefferson IP Law, LLP

(57) ABSTRACT

The present disclosure relates to a 5G or pre-5G communication system to be provided in order to support higher data transmission rates than 4G communication systems such as LTE. According to an embodiment of the present disclosure, disclosed is a method for a time-sensitive networking (TSN) application function device of a mobile communication system to report a delay time of the mobile communication system to a TSN server, wherein a residence time based on a grand master (GM) clock of the mobile communication system is received from a UE communicating with a first TNS node, and a packet delay budget (PDB) based on a clock of the mobile communication system is received from a user plane function (UPF) device that communicates with a second TSN node. The PDB is the time it takes to transmit packets or messages between the UE and a UPF, and bridge (Continued)

delay information based on a TSN clock is delivered to the TSN server on the basis of such information.

16 Claims, 11 Drawing Sheets

(51) Int. Cl.
   *H04L 41/0894* (2022.01)
   *H04L 43/0852* (2022.01)

(56) References Cited

U.S. PATENT DOCUMENTS

| | | | |
|---|---|---|---|
| 2019/0289616 A1 | 9/2019 | Hampel et al. | |
| 2020/0267673 A1 | 8/2020 | Joseph et al. | |
| 2021/0099341 A1 | 4/2021 | Moon et al. | |
| 2021/0359778 A1 | 11/2021 | Wang et al. | |
| 2021/0400524 A1* | 12/2021 | Kahn | H04L 65/80 |
| 2022/0046570 A1* | 2/2022 | Moon | H04J 3/0644 |
| 2022/0141786 A1 | 5/2022 | Ruffini et al. | |
| 2022/0210850 A1* | 6/2022 | Ke | H04L 47/2416 |
| 2022/0217505 A1 | 7/2022 | Fan et al. | |
| 2022/0239398 A1* | 7/2022 | Li | H04W 56/0015 |
| 2023/0309035 A1* | 9/2023 | Moon | H04W 56/006 |

FOREIGN PATENT DOCUMENTS

| | | | | |
|---|---|---|---|---|
| WO | WO-2019214810 A1 * | 11/2019 | | H04W 72/543 |
| WO | 2020/081060 A1 | 4/2020 | | |
| WO | 2020/104953 A1 | 5/2020 | | |
| WO | WO-2020239231 A1 * | 12/2020 | | H04L 45/745 |
| WO | 2021/066531 A1 | 4/2021 | | |
| WO | 2021/067130 A1 | 4/2021 | | |

OTHER PUBLICATIONS

Nokia et al., '5GS Bridge Delay Reporting', S2-1910957, SA WG2 Meeting #136, Reno, NV, USA, Nov. 8, 2019.
Huawei et al., 'Updates for Bridge Delay information reporting', S2-1911172, 3GPP TSG-WG SA2 Meeting #136, Reno, NV, USA, Nov. 8, 2019.
Qualcomm Incorporated et al., '5GS Bridge Management', S2-1912360, 3GPP TSG-SA WG2 Meeting #136, Reno, NV, USA, Nov. 21, 2019.
Korean Notice of Allowance dated May 26, 2022 issued in Korean Patent Application No. 10-2020-0005658.
"3rd Generation Partnership Project; Technical Specification Group Services and System Aspects; Study on enhancement of 5G System (5GS) for vertical and Local Area Network (LAN) services (Release 16)", 3GPP Draft; 23734-G20_CRS_Implemented, 3rd Generation Partnership Project (3GPP), Mobile Competence Centre ; 650, Route Des Lucioles ; F-06921 Sophia-Antipolis Cedex ; France, vol. SA WG2 Jun. 10, 2019 (Jun. 10, 2019), XP051751787.
Extended European Search Report dated Oct. 25, 2022, issued in European Application No. 20912511.1-1213.
Qualcomm Incorporated: "Addressing open issues for Ethernet port management", [Online] Oct. 17, 2019(Oct. 17, 2019), 3GPP Draft; S2-1910427—Was—S2-1910424—Was—S2-1909069-235-01 Completin G Ethernet Port Management_V1, 3rd Generation Partnership Project (3GPP), Mobile Competence Centre; 650, Route Des Lucioles; F-06921 Sophia-Antipolis Cedex ; France, XP051797226.
Anonymous: "3rd Generation Partnership Project; Technical Specification Group Services and System Aspects; System Architecture for the 5G System (5GS); Stage 2 (Release 16)", [Online] Sep. 24, 2019 (Sep. 24, 2019), 3GPP Standard; Technical Specification; 3GPP TS 23.501, 3rd Generation Partnership Project (3GPP), Mobile Competence Centre; 650, Route Des Lucioles ; F-06921 Sophia-Antipolis Cedex ; France, pp. 1-391, XP051784669.
European Search Report dated Feb. 7, 2024, issued in European Application No. 23207378.3.

* cited by examiner

METHOD AND DEVICE FOR DELIVERING TIME-SENSITIVE NETWORKING SYNCHRONIZATION INFORMATION IN MOBILE COMMUNICATION SYSTEM

CROSS-REFERENCE TO RELATED APPLICATION(S)

This application is a continuation application of prior application Ser. No. 17/786,165, filed on Jun. 16, 2022, which is a U.S. National Stage application under 35 U.S.C. § 371 of an International application number PCT/KR2020/018975, filed on Dec. 23, 2020, which is based on and claims priority of a Korean patent application number 10-2020-0001736, filed on Jan. 6, 2020, in the Korean Intellectual Property Office, and of a Korean patent application number 10-2020-0005658, filed on Jan. 15, 2020, in the Korean Intellectual Property Office, the disclosure of each of which is incorporated by reference herein in its entirety.

TECHNICAL FIELD

The disclosure relates to a method and device for supporting time sensitive networking (TSN) in a wireless communication network, and more particularly, to a method and device for providing clock synchronization.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the 5G system, the support for various services is being considered compared to the existing 4G system. For example, the most representative services may be an enhanced mobile broad band (eMBB), ultra-reliable and low latency communication (URLLC), massive machine type communication (mMTC), evolved multimedia broadcast/multicast service (eMBMS), and the like. A system providing the URLLC service may be referred to as a URLLC system, and a system providing the eMBB service may be referred to as an eMBB system. Further, the terms "service" and "system" may be used interchangeably.

The URLLC service is a service newly considered in the 5G system, unlike the existing 4G system, and requires ultra-high reliability (e.g., about 10-5 packet error rate) and low latency (e.g., about 0.5 msec) conditions to be satisfied compared to other services. In order to satisfy such strict requirements, the URLLC service may need to apply a shorter transmission time interval (TTI) than that of the eMBB service, and various operation methods using this are being considered.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In mobile communication networks, time sensitive networking (TSN) is being discussed. It is expected that these TSNs will be mainly used in fields such as audio/video or factory automation.

DISCLOSURE OF INVENTION

Technical Problem

When a terminal connected to a 3GPP network sets up a PDU session for TSN synchronization, port management information is also transmitted, but reference times of the 3GPP network and a TSN network are actually different and the transmitted information is based on a 3GP network reference time; thus, the information is inaccurate from the viewpoint of the TSN network, and information is insufficient upon PDU session setup, so that the information cannot be converted into the reference time of the TSN network.

Solution to Problem

According to an embodiment of the disclosure, a method for reporting a delay time of a mobile communication system to a time sensitive networking (TSN) server in a TSN application function device of a mobile communication system includes receiving a residence time based on a grand master (GM) clock of the mobile communication system from an UE communicating with a first TNS node; receiving a packet delay budget (PDB) based on a clock of the mobile communication system from a user plane function (UPF) device communicating with a second TSN node, wherein the PDB is a transmission elapsed time of a message or a packet between the UE and the UPF; receiving information on a difference between a GM clock of the mobile communication system and the TSN grand master clock from the UPF device; calculating a bridge delay using the residence time and the PDB; converting the bridge delay into a bridge delay based on the TSN clock based on the difference information; and transmitting bridge information including a bridge delay converted based on the TSN clock to the TSN server.

According to an embodiment of the disclosure, a time sensitive networking (TSN) application function device for reporting a delay time of a mobile communication system to a TSN server includes a network interface configured to communicate with nodes of the mobile communication network and a TSN node; a memory configured to store a delay time of data of the TSN; and at least one processor, wherein the at least one processor is configured to receive a residence time based on a grand master (GM) clock of the mobile communication system from an UE communicating with the first TNS node through the network interface, to receive a packet delay budget (PDB) based on a clock of the mobile communication system from a user plane function (UPF) device communicating with a second TSN node through the network interface, wherein the PDB is a transmission elapsed time of a message or a packet between the UE and the UPF, to receive information on a difference between the GM clock of the mobile communication system and the TSN grand master clock from the UPF device, to calculate a bridge delay using the residence time and the PDB, to convert the bridge delay into a bridge delay based on the TSN clock based on the difference information, and to transmit bridge information including a bridge delay converted based on the TSN clock to a TSN server.

Advantageous Effects of Invention

Because a TSN AF of a 3GPP network may transmit inaccurate information or cannot know reference time information, an entity of TNS network may not be able to convert to an accurate time. However, in case that a method and device according to the disclosure are applied, accurate information can be transmitted to the TSN AF or the entity of TNS network can be converted into accurate information.

MODE FOR THE INVENTION

Hereinafter, an operating principle of the disclosure will be described in detail with reference to the accompanying drawings. In the following description, in describing the disclosure, when it is determined that a detailed description of a related well-known function or configuration may unnecessarily obscure the gist of the disclosure, a detailed description thereof will be omitted. Terms described below are terms defined in consideration of functions in the disclosure, which may vary according to intentions or customs of users and operators. Therefore, the definition should be made based on the content throughout this specification.

Hereinafter, a term identifying an access node used in the description, a term indicating network entities, a term indicating messages, a term indicating an interface between network objects, a term indicating various identification information and the like are exemplified for convenience of description. Accordingly, the disclosure is not limited to the terms described below, and other terms indicating objects having equivalent technical meanings may be used.

Hereinafter, for convenience of description, the disclosure uses terms and names defined in 5GS and NR standards, which are the latest standards defined by the 3rd generation partnership project (3GPP) organization among currently existing communication standards. However, the disclosure is not limited by the terms and names, and may be equally applied to a wireless communication network conforming to other standards. In particular, the disclosure is applicable to 3GPP 5GS/NR (5th generation mobile communication standard).

Time sensitive networking (TSN) is a set of several standards related to time synchronization and low latency support for supporting audio/video and/or factory automation, resource management therefor, and reliability improvement. Methods for supporting the TSN in a 3GPP network have been proposed.

Figure 1:
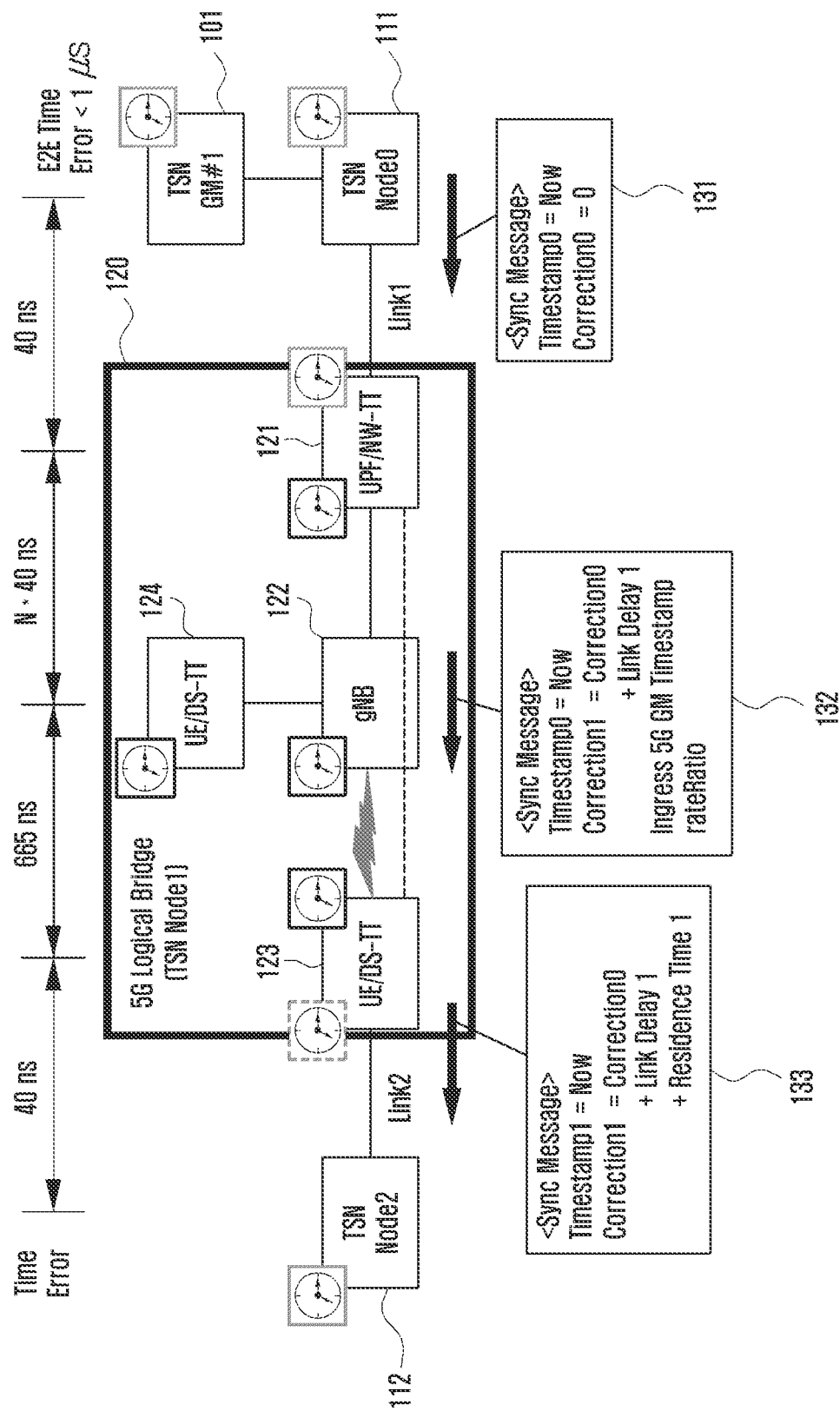
FIG. 1 is a diagram conceptually illustrating a TSN synchronization support process through a 3GPP network.

FIG. 1 is a diagram conceptually illustrating a TSN synchronization support process through a 3GPP network.

Before describing with reference to FIG. 1, in order to support time synchronization in wired network TSN, each TSN node may add a time stamp based on a TSN grand master (GM) clock to transmit a synchronization frame. The GM clock may be provided from a specific node such as a TSN GM #1, 101 in an example of FIG. 1. Accordingly, after adding the GM clock received from the TSN GM #1, 101 as a time stamp, a TSN node 0, 111 may transmit a synchronization message or synchronization frame to a next node. In this way, the TSN node that has received the synchronization message or synchronization frame may reflect a propagation delay of a link and a residence time, which is a delay time in a node thereof to a correction field of the synchronization frame, and then transmit the propagation delay and the residence time to a next TSN node. Through such a process, all TSN nodes can achieve time synchronization based on the TSN GM clock.

In order to support such TSN synchronization even in a 3GPP network, a method in which the 3GPP network operates as one TSN node has been proposed. In a scheme in which the 3GPP network operates as one TSN node, all UEs/gNBs/UPFs in the 3GPP network should be synchronized to the 5G GM clock. For this purpose, it is assumed that a RAN (gNB, base station) is connected to the 3GPP GM (not illustrated in FIG. 1), and it is assumed that an UPF connected to the RAN by the wired network also uses a wired network TSN synchronization scheme or is synchronized to the 5G GM clock using other schemes.

In the 3GPP network, the RAN and the UE are connected through a 5G air protocol, and in this process, in order to precisely support synchronization with the UE (e.g., so that a time error is less than 656 ns), the RAN should additionally provide several functions. Examples of functions that should be additionally provided may include accurate timing delivery by RRC/SIB, finer timing advance (TA) granularity, and propagation delay compensation.

Hereinafter, a configuration of FIG. 1 will be described, and then an operation according to FIG. 1 will be described.

With reference to FIG. 1, the TSN GM clock may be provided from a specific node for providing a GM clock such as the TSN GM #1, 101 to at least one TSN node existing on a TSN wired network in an example of FIG. 1. FIG. 1 illustrates a case of providing a GM clock from the TSN GM #1, 101 to the TSN node 0, 111. Further, the next node may be a 3GPP network, for example, a 5G network 120. FIG. 1 illustrates that a link 1 is configured between the TSN node 0, 111 and the 5G network 120. Therefore, the TSN node 0, 111 may generate a synchronization message or synchronization frame 131 using a GM clock provided by the TSN GM #1, 101 as a timestamp and then provide the synchronization message or synchronization frame 131 to the 5G network 120, which is a next node. The 5G network 120 may process the synchronization message or synchronization frame 131 to generate and transmit a synchronization message or synchronization frame 133 through a link 2 with a TSN node 2, 112, which is a next TSN node.

Hereinafter, an internal configuration of the 5G network 120 will be briefly described with reference to FIG. 1. In a node of the 5G network 120 that receives a synchronization message or synchronization frame with the TSN node 0, 111, which is the first node through the link 1, a user plane function (UPF) 121 may serve as a gateway that transmits a packet transmitted and received by the UE 123 or 124. The UPF 121 may be a PDU session anchor (PSA) UPF serving as an anchor of a PDU session connected to a data network. All data sent by the UE to the data network may be transmitted through the anchor UPF.

The UPF 121 may also include a network side TSN translator (NW-TT) for an operation of the TSN network. The NW-TT may be in charge of some functions of Ethernet related protocols required for the 5GS to support TSN and collect and manage information on neighboring nodes through synchronization frame interpretation and processing, port information management, and link layer discovery protocol (LLDP). Hereinafter, in all embodiments according to the disclosure, unless it is specifically stated that the UPF 121 does not include a NW-TT, it is assumed that the UPF 121 includes a NW-TT.

The UPF 121 may generate a new synchronization message or synchronization frame 132 in which information such as link delay and propagation delay, as described above is added to the synchronization message or synchronization frame 131 received from the TSN node 0, 111 and transmit the new synchronization message or synchronization frame 132 to a gNB 122 in the 5G network 120. In this case, the gNB 122 and the UPF 121 may be in a state connected by wire, and at least one other network function device may be included therebetween.

The gNB 122 may add information such as link delay and propagation delay to the synchronization message or synchronization frame received from the UPF 121 and provide the synchronization message or synchronization frame to the UE 123. In this case, a message or frame may be transmitted between the gNB 122 and the UE 123 through a radio channel, as well known.

Accordingly, the UE 123 may generate a synchronization message or synchronization frame 133 including information such as propagation delay and link delay in the synchronization message or synchronization frame received from the gNB 122 and provide the synchronization message or synchronization frame 133 to the TSN node 2, 112. In this case, the UE 123 and the TSN node 2, 112 may be connected by wire, and the UE 123 may transmit a synchronization message or synchronization frame through the link 2.

Based on the above description, a synchronization process in a downlink direction will be described.

The downlink may be a case that the 3GPP core network receives a synchronization message or synchronization frame from a specific TSN node and that data is transmitted in a direction of a final TSN node through a base station and a UE of the 3GPP network. In FIG. 1, a direction from the TSN node 0, 111 to the TSN node 2, 112 is referred to as a downlink.

In a state in which all entities or nodes in the 3GPP network are synchronized to the 5G GM clock, when the UPF 121 receives a synchronization frame, the UPF 121 may include an ingress time stamp based on a 5G GM in the synchronization message or synchronization frame 132. Further, the UPF 121 may include a link delay measured/ calculated and managed in advance and the TSN node 0, 111 that has transmitted the synchronization message or synchronization frame in the synchronization message or synchronization frame 132 and transmit the synchronization message or synchronization frame 132 to the gNB 122, which is a next node in the 5G network. Accordingly, the gNB 122 may transmit the synchronization message or synchronization frame 132 to the UE 123.

When the UE 123 receives a synchronization message or synchronization frame from the gNB 122, the UE 123 may calculate a time that transmits the synchronization message or synchronization frame to an external TSN node based on the 5G GM clock, calculate a difference between the time and an ingress time, and reflect the difference as a residence time to the correction field, thereby completing a TSN synchronization operation. The generated synchronization message or synchronization frame 133 may be provided to the TSN node 2, 112.

Hereinafter, synchronization in an uplink direction will be described. The uplink may be a case that a UE of the 3GPP network receives a synchronization message or synchronization frame from a final TSN node in the downlink and that data is transmitted in a direction of an initial TSN node transmitting a message or data performing the control in the downlink through the UPF of the 3GPP core network via the base station. In FIG. 1, a direction from the TSN node 2, 112 to the TSN node 0, 111 is referred to as an uplink.

For uplink synchronization, when the UE 123 may include an ingress time, which is a time based on the 5G GM that has received a synchronization frame from the TSN node 0, 111, which is the previous TSN node and a link delay with the TSN node 2, 112 in the synchronization frame and transmit the synchronization frame to the UPF 121 through the gNB 122. Accordingly, the UPF 121 may calculate a time that transmits the synchronization frame to the TSN node 0, 111, which is an external TSN node based on the 5G GM clock, calculate a difference between the time and the ingress time, and reflect the difference as a residence time to the correction field. Through such a process, the 3GPP network may maintain a TSN synchronization time error to less than 1 μs.

Figure 2:
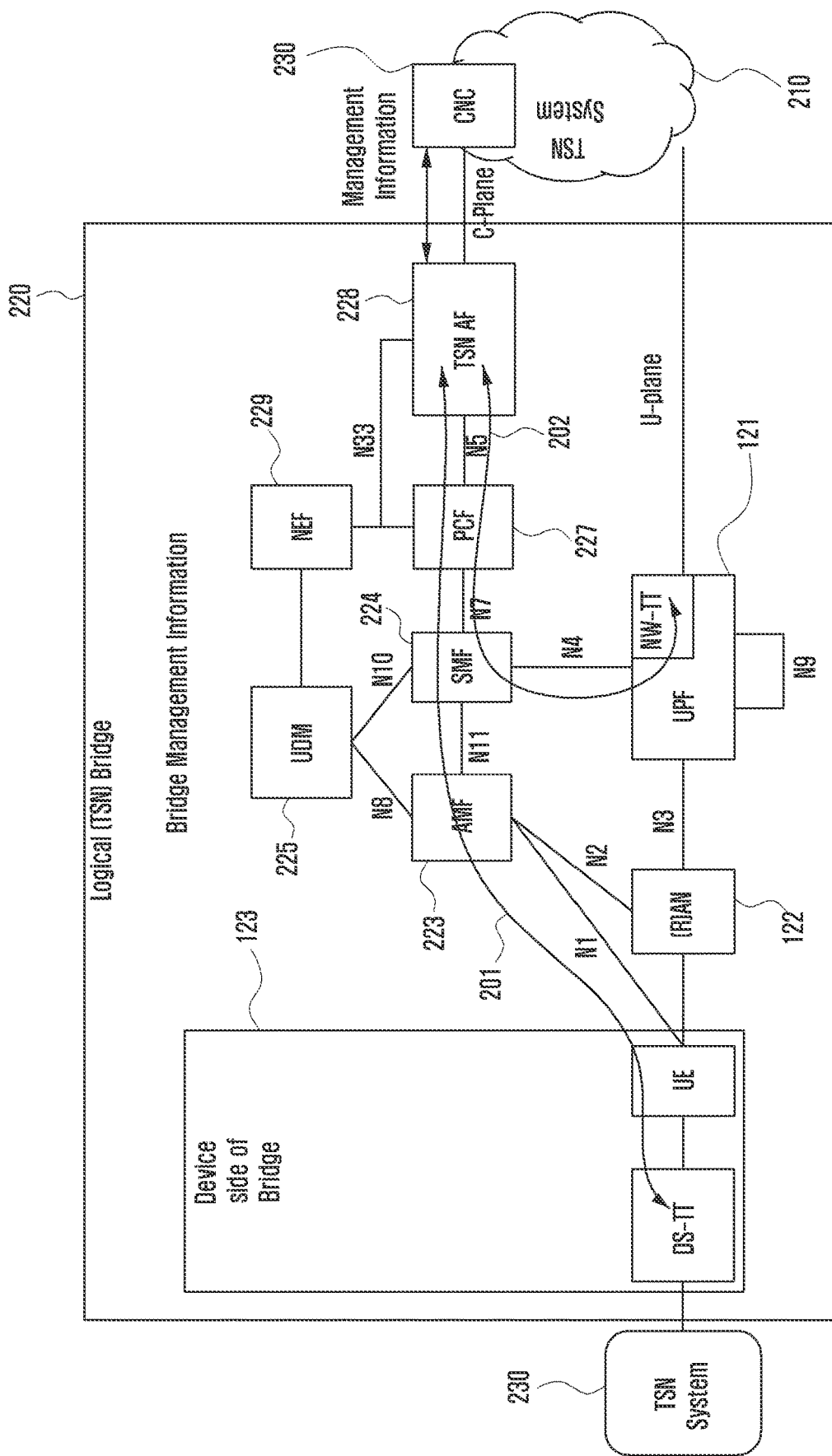
FIG. 2 is a diagram illustrating information transmission and a structure of a 3GPP network in case that a 5GS supports TSN in a centralized model of TSN.

FIG. 2 is a diagram illustrating information transmission and a structure of a 3GPP network in case that a 5GS supports TSN in a centralized model of the TSN.

With reference to FIG. 2, a second TSN system 210 may include a centralized network configuration (CNC) server 230. Further, a wireless communication network 220 may operate as one TSN bridge. Here, the wireless communication network may be a 3GPP network, as described above, and in particular, the wireless communication network may be a network according to 5G or NR standards. However, the disclosure is not limited thereto, and in case that other wireless networks include functions described in the disclosure, other wireless networks may be equally applicable.

FIG. 2 illustrates a case that the wireless communication network 220 is positioned between the second TSN system 210 and the first TSN system 230 to operate as one TSN bridge. A core network of 5G may be configured with the following network functions. Here, each of the network functions may be one network node constituting the wireless communication network 220. One network node constituting the wireless communication network 220 may take a physically and/or logically independent form, and be configured together with other specific nodes. Further, each of the network functions may be implemented by a specific device. As another example, each of the network functions may be implemented in a form in which a device and software are combined. As another example, each of the network functions may be implemented in software in a device on a specific collective network. Hereinafter, each network function will be denoted as "- function device". Hereinafter, network functions of a 5G core network will be described.

The wireless communication network 220 may include a UE 123 of a bridge, and a UE of a 3GPP network may include a user equipment (UE) and a device side TSN translator (DS-TT). Further, the DS-TT may be referred to as a TSN converter, be implemented in physical hardware, and be driven in an application of a UE or in a communication processor (CP). As another example, the DS-TT has separate hardware, but may be controlled by an application of the UE or a lower layer of the application. The DS-TT may be in charge of some functions of Ethernet related protocols necessary for the 5GS to support TSN, and perform synchronization frame interpretation and processing, port information management, and collection and management of peripheral node information through a link layer discovery protocol (LLDP). Here, the UE 123 may be a device including a RF unit (not illustrated in FIG. 2) for transmitting and receiving control signals and data to and from a 5G network, and a controller (not illustrated in FIG. 2) for controlling the same. Further, the UE 123 may further include various input and output devices for an interface with a user, for example, a display, an input unit (touch screen and/or key input unit), and a memory. Further, if necessary, the UE 123 may further include various communication devices such as various sensors, a GPS receiving module, a camera module, and other wireless communication protocols, for example, WiFi and Bluetooth.

A RAN 122 may be a base station of a 5G network. Although in FIG. 2, the base station of the 5G network is described as the RAN, the 5G standard calls the base station to a gNB; thus, the gNB and the RAN may be the same component. Therefore, hereinafter, the gNB and the RAN will be used interchangeably.

Accordingly, the UE 123 and the RAN 122 may transmit and receive data and control signals using a 5G radio channel. A user plane function (UPF) 121 may serve as a gateway for transmitting packets transmitted and received by the UE 123. The UPF 121 may be a PDU session anchor (PSA) UPF serving as an anchor of a PDU session connected to a data network. All data transmitted by the UE 123 to the data network may be transmitted through the anchor UPF. Data packets sent to a centralized data network or an Internet data network are transmitted to the PSA UPF of the corresponding PDU session.

The access and mobility management function (AMF) 232 may perform a network function of managing the mobility of the UE. A session management function (SMF) 224 may perform a network function of managing a packet data network connection provided to the UE. The connection may be referred to as a protocol data unit (PDU) session.

A policy and charging function (PCF) 227 may perform a network function of applying a service policy of a mobile communication operator for the UE 123, a charging policy, and a policy for a PDU session. A unified data management (UDM) 224 may perform a network function of storing information on a subscriber. A network exposure function (NEF) 229 enables a specific node of an external network, not a 3GPP network, to access information managing the UE 321 in the 5G network to perform a subscription to a mobility management event of the corresponding UE, a subscription to a session management event of the corresponding UE, a request for session related information, a configuration of charging information of the corresponding UE, and a request for a PDU session policy change for the corresponding UE.

A case that the 3GPP network 220 is modeled as a logical bridge using the configuration of FIG. 2 described above will be described.

The DS-TT/UE 123 and the NW-TT/UPF 121 of the 3GPP network 220 may operate as input and output ports, respectively, of a 5GS logical bridge and transmit information of the corresponding port to a TSN AF 228. Because the disclosure illustrated in FIG. 2 relates to a process of collecting bridge port management information, it will be described in response thereto. The TSN AF 228 may transmit the collected information to a server of the CNC 230 of TSN. The TSN AF 228 may configure 5GS bridge port management information using the information received from the CNC 230. In this case, the necessary information for each port may be configured to use the same path. For example, the DS-TT/UE 123 may use a path of the DS-TT/UE 123<->the gNB 122<->the AMF 223<->the SMF 224<->the PCF 227<->the TSN AF 228, as indicated by reference numeral 201. Further, the NW-TT/UPF 121 may send necessary information to the TSN AF 228 using a path of the NW-TT/UPF 121<->the SMF 224<->the PCF 227<->the TSN AF 228, as indicated by reference numeral 202 or conversely, the NW-TT/UPF 121 may receive necessary information from the TSN AF 228 using a path of a reverse direction. This process may be made by applying the PDU session establishment and modification procedures.

As described above, in case that management information is exchanged with the TSN 210 using the path indicated by reference numeral 201 or the path indicated by reference numeral 202, necessary bridge management information may be collected.

Figure 3:
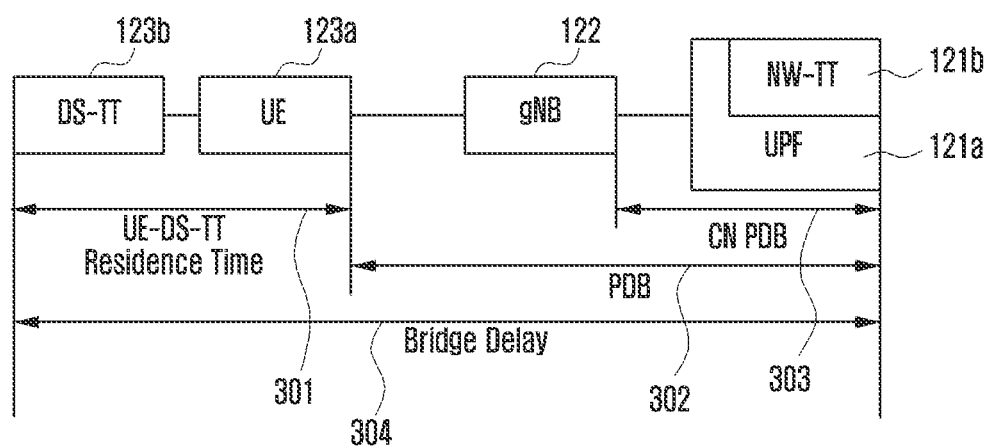
FIG. 3 is a diagram illustrating that port management information is collected in a path on a mobile communication network according to an embodiment of the disclosure.

FIG. 3 is a diagram illustrating that port management information is collected in a path on a mobile communication network according to an embodiment of the disclosure.

FIG. 3 is a diagram illustrating a configuration of a bridge delay, which is one of port management information, in particular according to the disclosure.

FIG. 3 illustrates that a configuration of the UE 123 is separated into a DS-TT 123*b* corresponding to an input/output port of a TSN node and a UE 123*a* for performing wireless communication in a 5G network, and illustrates that the UPF 121 is separated into a UPF 121*a* for performing data transmission and reception in the 5G network and an operation in the 5G network and a NW-TT 121*b* corresponding to the input and output port of the TSN node. The DS-TT may be implemented separately from the UE or may be implemented together with the UE. Similarly, the NW-TT may be implemented separately from the UPF or may be implemented together with the UPF. The DS-TT or the NW-TT may be in charge of an Ethernet related protocol processing function for the 5GS to interwork with the TSN. For example, the DS-TT or the NW-TT may be in charge of a function of receiving, interpreting, and updating a synchronization Ethernet frame from an external TSN node. Further, the DS-TT or the NW-TT may be in charge of a port information management function.

In general, in the UE 123, a DS-TT-UE residence time 301 is an elapsed time between the DS-TT 123*b* and the UE 123*a*, and a packet delay budget (PDB) 302 means an elapsed time from the UE 123*a* to the NW-TT/UPF 121. The DS-TT-UE residence time 301 according to the disclosure may be preconfigured to the DS-TT/UE. The PDB 302 may be a value determined according to a QoS configuration value upon PDU session setup. The DS-TT-UE residence time 301 may be provided from the UE 123*a* upon PDU session setup or may be a value known in advance in the 3GPP network. The DS-TT-UE residence time 301 may be a value based on the 5GS grand master (GM) clock. In this case, the PDB 302 may also be a value based on the 5GS GM clock.

If necessary, the PDB may be divided into a core network (CN) PDB and an access network (AN) PDB. The CN PDB is an elapsed time corresponding to a section from the NW-TT/UPF to just before the gNB, and may include an elapsed time in the NW-TT/UPF and an elapsed time in backhaul between the UPF and the gNB. The AN PDB is an elapsed time corresponding to the remaining sections except for the CN PDB from the PDB, and may include an elapsed time in the gNB and an elapsed time in a radio link between the gNB and the UE.

Therefore, as described above, the bridge delay 304 in the 5G network may be configured with the sum of the DS-TT-UE residence time 301 and the PDB 302.

Figure 4:
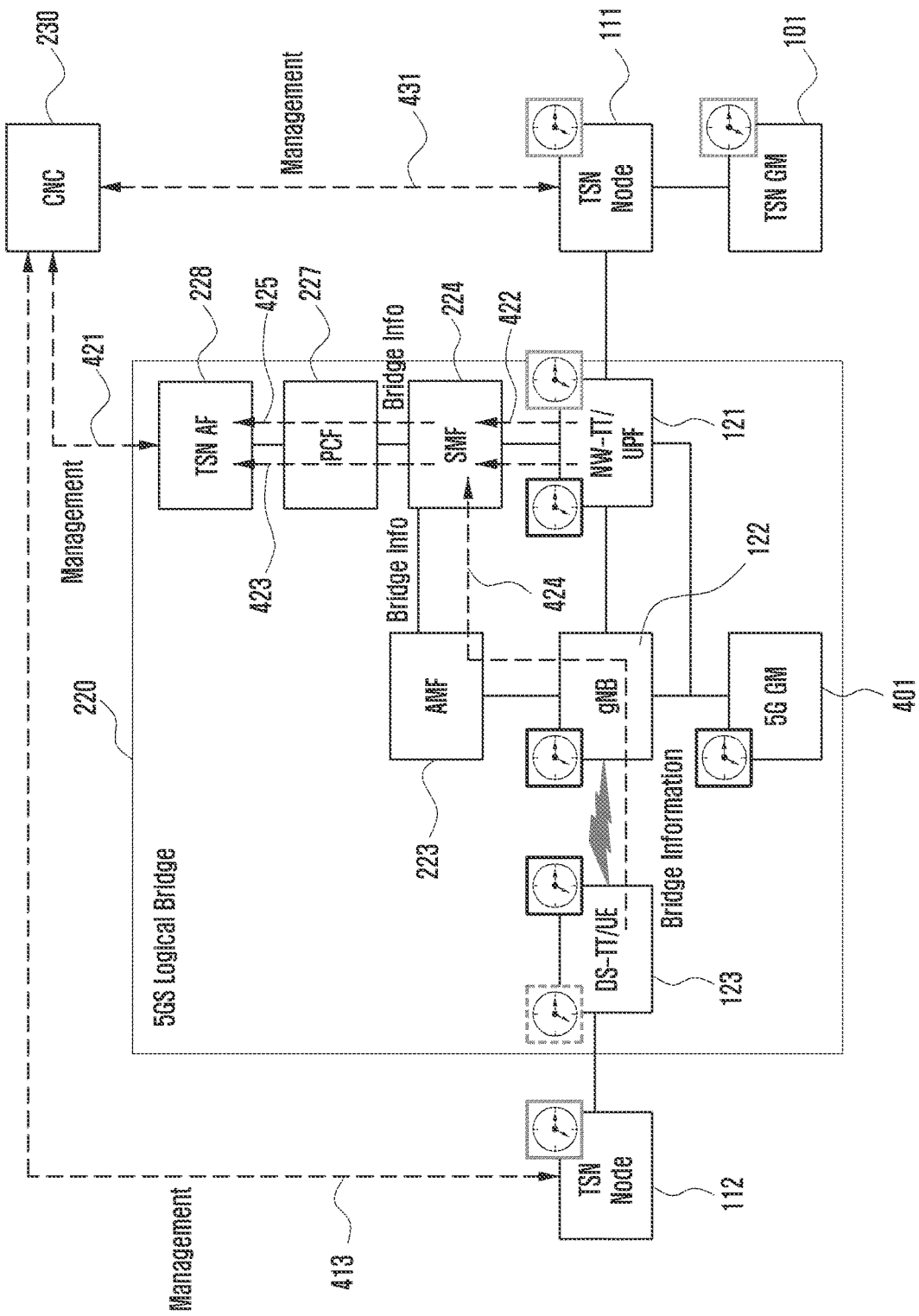
FIG. 4 is a configuration diagram illustrating delivery of a bridge delay within a 5GS in case that a TSN AF is not a TSN synchronization client according to a first embodiment of the disclosure.

FIG. 4 is a configuration diagram illustrating delivery of a bridge delay within a 5GS in case that a TSN AF is not a TSN synchronization client according to a first embodiment of the disclosure.

Referring first to FIG. 4, a wireless communication network 220 may operate as one TSN bridge between a TSN node 0, 111 and a TSN node 2, 112. Here, the wireless communication network may be a 3GPP network, as described above, and in particular, the wireless communication network may be a network according to 5G or NR standards. However, a wireless communication network according to the disclosure is not limited to a network according to 5G or NR standards, and in case that other wireless networks include a function (or corresponding devices) described in the disclosure, other wireless networks may be equally applicable.

FIG. 4 illustrates a case that the wireless communication network 220 is positioned between the TSN node 0, 111 and the TSN node 2, 112 to operate as one TSN bridge. A 5G core network may be configured with the following network functions. Here, each of the network functions may be one network node. One network node may take a physically and/or logically independent form, and be configured together with other specific nodes. Further, each of the network functions may be implemented by a specific device. As another example, each of the network functions may be implemented in a form in which a device and software are combined. As another example, each of the network functions may be implemented in software in a device on a specific collective network. Hereinafter, each network function will be denoted as "-function device". Hereinafter, network functions of a 5G core network will be described.

The wireless communication network 220 may include a UE 123 of a bridge, and a 3GPP network UE may include a user equipment (UE) and a DS-TT. Here, the UE 123 may be a device including a RF unit (not illustrated in FIG. 4) for transmitting and receiving control signals and data to and from a 5G network and, and a controller (not illustrated in FIG. 4, but may be configured with a microprocessor) for controlling the same.

A gNB 122 may be a base station of a 5G network. FIG. 4 illustrates a base station of a 5G network as a gNB, but the gNB and the RAN may be the same component. Therefore, hereinafter, the gNB, the RAN, and the base station will be used interchangeably.

Accordingly, the UE 123 and the gNB 122 may transmit and receive data and control signals using a 5G radio channel. A user plane function (UPF) 121 may serve as a gateway for transmitting packets transmitted and received by the UE 1223. The UPF 121 may be a PDU session anchor (PSA) UPF serving as an anchor of a PDU session connected to the data network. All data sent by the UE to the data network may be transmitted through the anchor UPF. Data packets to be sent to a centralized data network or an Internet data network are transmitted to the PSA UPF of the corresponding PDU session.

An access and mobility management function (AMF) 232 may perform a network function of managing the mobility of the UE. A session management function (SMF) 224 may perform a network function of managing a packet data network connection provided to the UE. A connection may be referred to as a protocol data unit (PDU) session. The policy and charging function (PCF) 227 may perform a network function of applying a service policy of a mobile communication operator for the UE 123, a charging policy, and a policy for a PDU session.

A case that the 3GPP network 220 is modeled as a logical bridge using the configuration of FIG. 4 described above will be described.

A path in which bridge port management information from the DS-TT/UE 123 is provided to the SMF 224 is indicated by reference numeral 424. The information may be transmitted from the SMF 224 to a TSN AF 228 via the PCF 227, as indicated by reference numeral 423. Bridge port management information from the NW-TT/UPF 121 may also be provided to the SMF 224, as indicated by reference numeral 422. The SMF 224 may transmit the information to the TSN AF 228 through the PCF 227, as indicated by reference numeral 425. In this case, both the DS-TT-UE residence time 301 and the PDB 302 value configured inside the 5GS are values based on the 5GS GM clock, whereas values transmitted to a CNC 230 of TSN by the TSN AF 228 are values based on the TSN GM clock. Therefore, the bridge delay should be converted from the basis of the 5GS GM clock to the basis of the TSN GM clock before the TSN AF 228 transmits bridge delay information to the CNC 230. According to the subject of conversion, a detailed method thereof may be divided into the following three types.

In a method 1, the DS-TT/UE 123 and the NW-TT/UPF 121 perform the conversion. In the method 1, the TSN AF 228 does not need to have the burden of converting bridge delay information. Further, because information is transparently transmitted between the DS-TT/UE 123 and the TSN AF 228 and between the NW-TT/UPF 226 and the TSN AF 228, there is no need for the SMF 224 to separately manage bridge delay information in the middle.

In a method 2, the SMF 224 performs the conversion. In the method 2, the TSN AF 228 does not need to have the burden of converting bridge delay information. The DS-TT/UE 123 or the NW-TT/UPF 121 also does not need to have the burden of converting bridge delay information. In the method 1, bridge delay information has been used for transparently transmitting information between the DS-TT/UE 123 and the TSN AF 228 and between the NW-TT/UPF 121 and the TSN AF 228, but in the method 2, the SMF 224 should manage separately the bridge delay information in the middle. In this case, the NW-TT/UPF 121 should transmit information on a difference between the 5GS GM clock and the TSN GM clock to the SMF 224. Therefore, because the NW-TT/UPF 121 only needs to use an N4 interface, the NW-TT/UPF 121 may transmit information on a difference between the clocks relatively easier than the DS-TT/UE 123 that should transmit signaling via the RAN (gNB) 122 section.

In a method 3, the TSN AF performs the conversion. In the method 3, the TSN AF 228 instead of the DS-TT/UE 123, the NW-TT/UPF 121, or the SMF 224 has the burden of converting bridge delay information. Because information is transparently transmitted between the DS-TT/UE 123 and the TSN AF 228 and between the NW-TT/UPF 121 and the TSN AF 228, there is no need for the SMF 224 to separately manage bridge delay information in the middle. However, in this case, the NW-TT/UPF 121 should transmit information on a difference between the 5GS GM clock and the TSN GM clock to the TSN AF 228 via the SMF 224 and the PCF 227.

In a method 4, the PCF performs the conversion. In the method 4, the PCF 227 instead of the DS-TT/UE 123, the NW-TT/UPF 121, the SMF 224, or the TSN AF 228 has the burden of converting bridge delay information. Because the PCF 227 is positioned on a path of information provided to the TSN AF 228, the PCF 227 may obtain all information provided to the TSN AF 228. Accordingly, in case that the PCF 227 converts the bridge delay information, a load of the TSN AF 228 may be reduced.

Figure 5:
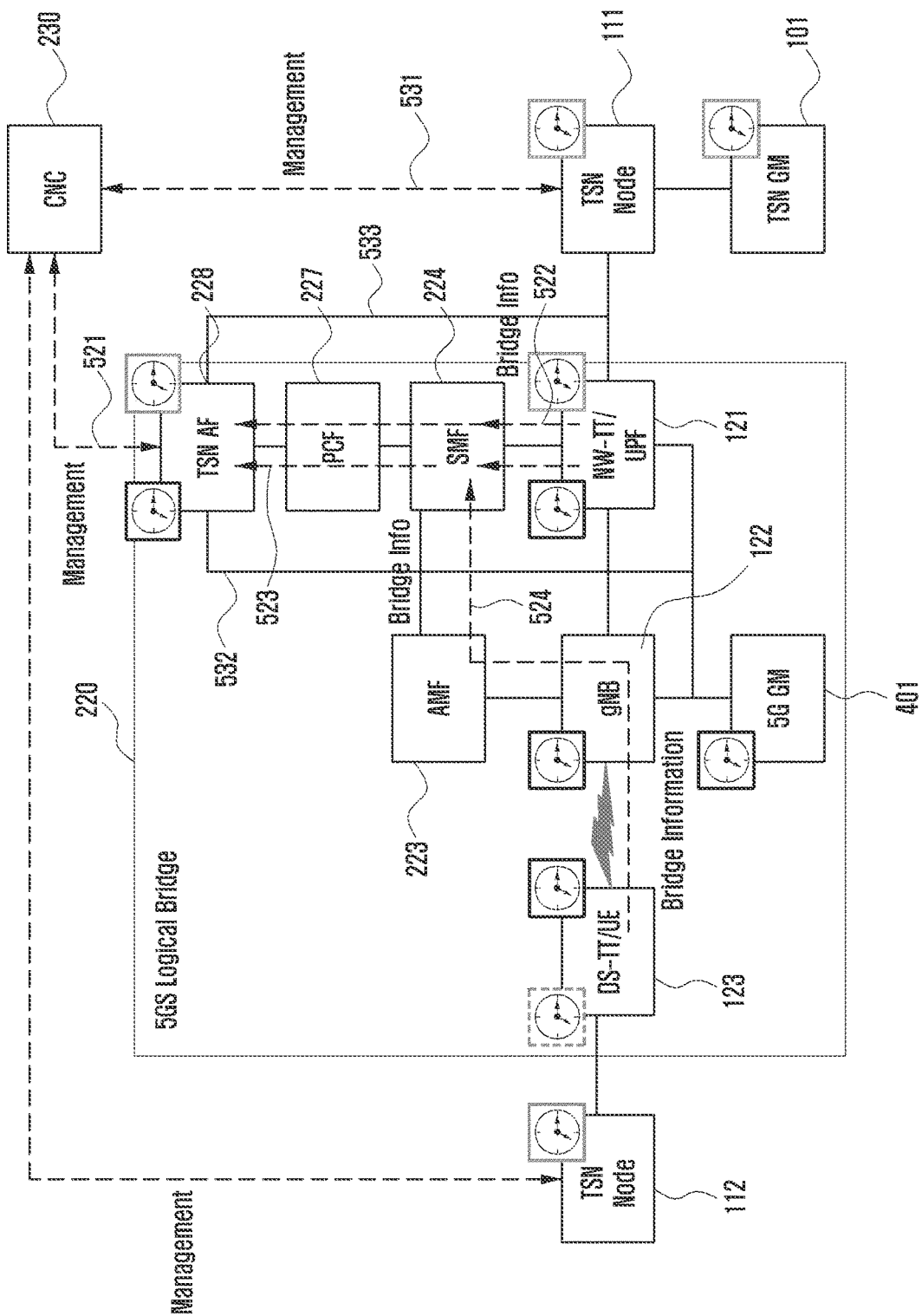
FIG. 5 is a configuration diagram illustrating delivery of a bridge delay within a 5GS in case that a TSN AF is a TSN synchronization client according to a second embodiment of the disclosure.

FIG. 5 is a configuration diagram illustrating delivery of a bridge delay within a 5GS in case that a TSN AF is a TSN synchronization client according to a second embodiment of the disclosure.

FIG. 5 illustrates the same configuration as that of FIG. 4 described above, and has some differences from FIG. 4 because the TSN AF 228 operates as a synchronization client. For example, the TSN AF 228 is connected to the 5G GM, as indicated by reference numeral 532 to perform clock synchronization, and as illustrated by the reference numeral 533, the TSN AF 228 is simultaneously connected to the TSN GM 101 through the TSN node 111 to perform clock Synchronization.

Bridge port management information from the DS-TT/UE 123 may be provided to the SMF 224, as indicated by reference numeral 524, and be transmitted from the SMF 224 to the TSN AF 228 via the PCF 227, as indicated by reference numeral 523. Bridge port management information from the NW-TT/UPF 121 may also be transmitted to the TSN AF 228 via the SMF 244, as indicated by reference numeral 522. In this case, both the DS-TT-UE residence time 301 and the PDB 302 value configured inside the 5GS are values based on the 5GS GM clock, whereas a value 521 transmitted to the CNC 230 of TSN by the TSN AF 228 is a value based on the TSN GM clock. Therefore, the bridge delay should be converted from the basis of the 5GS GM clock to the basis of the TSN GM clock before the TSN AF 228 transmits the bridge delay information to the CNC 230.

In this case, as described above, because the TSN AF 228 already has information on both the 5G GM clock and the TSN GM clock, the TSN AF 228 may secure a bridge delay based on the TSN GM clock in the PDU session establishment step.

Figure 6:
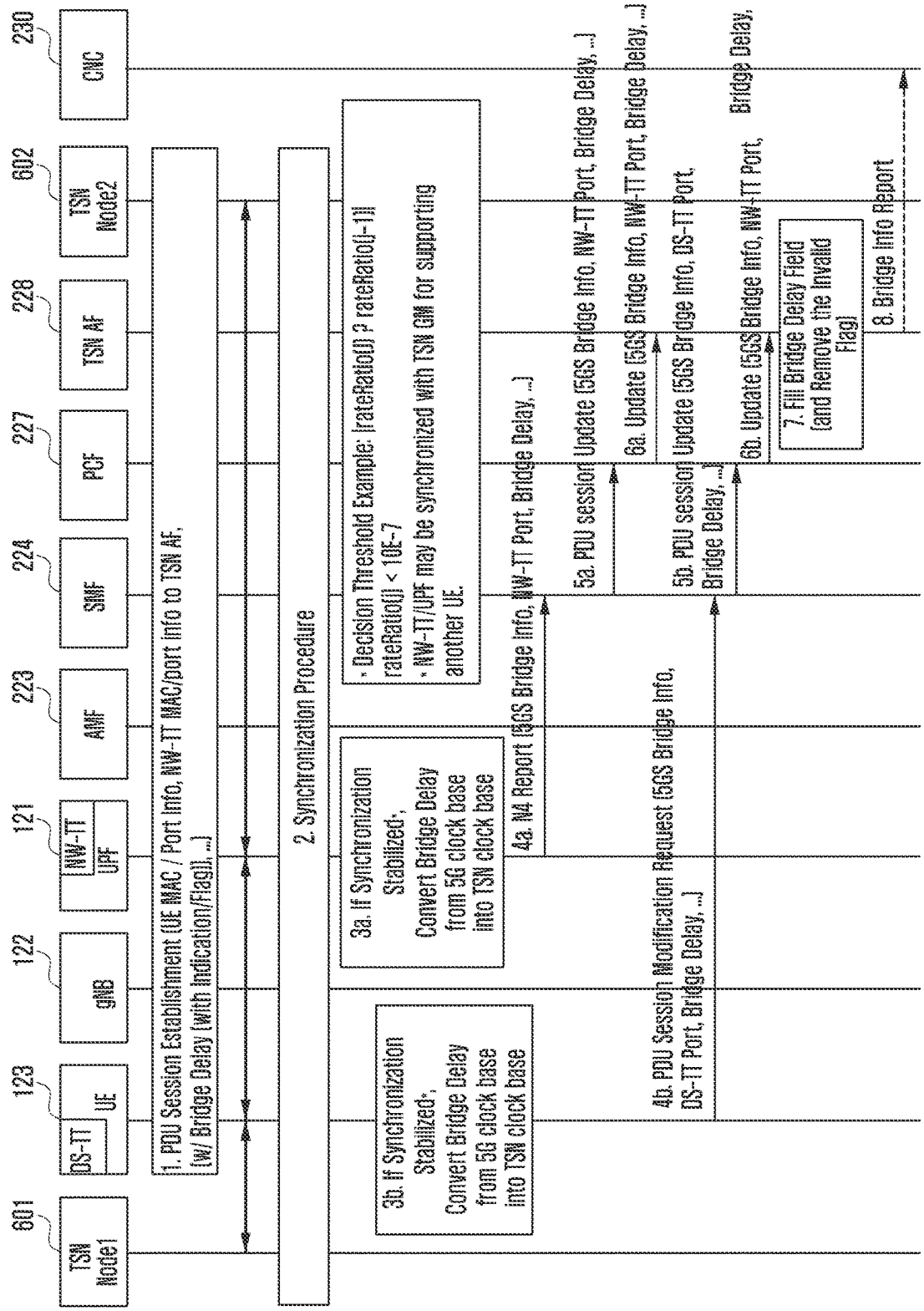
FIG. 6 is a signal flow diagram when both or one of a DS-TT/UE and an NW-TT/UPF converts a bridge delay in case that a TSN AF is not a TSN synchronization client as a case of a method 1 of a first embodiment of the disclosure.

FIG. 6 is a signal flow diagram when both or one of a DS-TT/UE and a NW-TT/UPF convert a bridge delay in case that a TSN AF is not a TSN synchronization client as a case of a method 1 of a first embodiment of the disclosure.

In the description of FIG. 6, the same reference numerals are used for the same components as those described with reference to FIGS. 1 to 5. However, a TSN node1 and a TSN node2 will be described with new reference numerals, respectively. This is to identify the TSN node1 and the TSN node2 because the TSN node2 described in FIG. 1 exists.

Unless TSN synchronization has already been stabilized as the NW-TT/UPF 121 performs a TSN synchronization process with a separate DS-TT/UE 123, the DS-TT/UE 123 and the NW-TT/UPF 121 may transmit bridge delay information to the TSN AF 228 through a process of setting up the PDU session in step 1. In this case, a value transmitted by the DS-TT/UE 123 may be the DS-TT-UE residence time 301, and a value transmitted by the NW-TT/UPF 121 may be a value of the PDB 302. However, because the information is based on the 5GS, the following three operation options may be obtained.

(1) Do not transmit this information.

(2) This information is transmitted, but it is indicated with a separate flag or indication that the information is based on the 5GS clock and is transmitted to the TSN AF 228.

(3) Bridge delay information is transmitted, but it may not be indicated that bridge delay information is based on 5GS clock. The bridge delay information transmitted to the TSN AF 228 means that a default value is based on a 5GS GM clock.

After performing a TSN synchronization process with a separate DS-TT/UE 123, the NW-TT/UPF 121 may have performed the PDU session establishment process of step 1 with the corresponding DS-TT/UE 123. In this case, the NW-TT/UPF 121 may transmit the bridge delay based on the TSN clock in step 1. In this case, the NW-TT/UPF 121 may convert the DS-TT-UE residence time 301 received from the DS-TT/UE 123 and the PDB 302 value thereof based on the TSN GM clock, and transmit the converted DS-TT-UE residence time 301 and PDB 302 value to the TSN AF 228. A method of indicating whether the transmitted bridge delay is based on a 5GS clock or a TSN clock may include a method of using a flag/indication or a method of configuring a default value based on the TSN GM clock and not sending a flag/indication. The former may correspond to (2)-A or (3) of step 3 to be described later, and the latter may correspond to (1) or (2)-B of step 3 to be described later. In this case, because the TSN AF 228 secures the bridge delay based on the TSN GM clock in step 1, step 7 may be performed immediately.

A TSN synchronization frame is exchanged between the TSN and the 5GS using a user plane path formed by a PDU session in step 2, and the DS-TT/UE and the NW-TT/UE of the 5GS achieve synchronization with the TSN GM.

In step 3, when the synchronization of TSN by the DS-TT/UE 123 and the NW-TT/UPF 121 enters a stable stage, the bridge delay information is converted from the basis of the 5GS GM clock to the basis of the TSN GM clock, and is transmitted again to the TSN AF 228. In this case, the following operation options may be obtained.

(1) If bridge delay information is not transmitted in step 1 ((1) in step 1), there is no need for the TSN AF 228 to distinguish whether the information is based on the 5GS clock or the TSN clock. Therefore, there is no need to send a separate flag/indication in step 3. This is because it can be seen that bridge delay is always transmitted to the TSN AF 228 only on the basis of the TSN GM.

(2) If a bridge delay is transmitted in step 1, but it is indicated that the bridge delay is information based on the 5GS clock and is transmitted to the TSN AF 228 ((2) in step 1), it should be specified whether a bridge delay value transmitted in step 3 is based on the TSN clock. In this case, the following additional operation options may be obtained.

(2)-A: It may be indicated through a flag or indication that a bridge delay value is based on a TSN clock.

(2)-B: A bridge delay value may be sent without any flag/indication. This case corresponds to a case of specifying that a default value of a bridge delay transmitted from the DS-TT 123*b* or the NW-TT 121*b* to the TSN AF 228 is based on the TSN GM clock, and if the bridge delay is not a default, the bridge delay is based on the 5GS clock.

(3) In step 1, a bridge delay is transmitted, but if there is no separate flag/indication that the bridge delay is information based on the 5GS clock ((3) in step 1), it means that a default value of bridge delay transmitted from the DS-TT 123*b* or the NW-TT 121*b* to the TSN AF 228 is based on 5GS GM clock, so that there should be a flag/indication that a bridge delay transmitted in step 3 is based on the TSN GM clock.

In step 3, there are the following two operation options, which may operate in combination with the operation options (1), (2)-A, (2)-B, and (3) described above.

(i) After synchronization is stabilized, both the DS-TT and the NW-TT may convert the bridge delay based on the TSN clock and transmit the converted bridge delay to the TSN AF 228. In this case, steps 3a/4a/5a/6a and 3b/4b/5b/6b are performed.

(ii) Only one of the DS-TT 123*b* and the NW-TT 121*b* may transmit information. The NW-TT/UPF 121 stores the DS-TT-UE residence time 301 transmitted by the DS-TT/UE 123 in step 1, and after TSN synchronization is stabilized in step 2, the NW-TT/UPF 121 may convert the values based on the TSN GM clock and then transmit the converted values to the TSN AF 228. In this case, only steps 3a/4a/5a/6a are performed.

The basis for determining whether synchronization is stabilized may be determined by referring to the basis of the TSN performance. For example, a rateRatio, which is a ratio of frequencies of the TSN GM clock and the local clock (5G GM clock) may be used. When a rateRatio value obtained by the j-th measurement is expressed with a rateRatio(j), if the rateRatio value becomes 0.1 PPM or less, it may be determined that the stabilization stage has been entered. That is, when "|rateRatio(j)−rateRatio(j−1)|/rateRatio(j)<10E-7" is satisfied, it may be determined that the stabilization stage has been entered.

In step 4a, the NW-TT/UPF 121 may send 5GS bridge info, NW-TT port, bridge delay, and flag/indication to the SMF 224. In this case, the bridge delay is based on the TSN GM clock, and a method of indicating that the value is based on the TSN GM clock varies according to cases of (1), (2), (3) in step 1 and (1), (2)-A, (2)-B, and (3) in step 3 described above.

In step 4b, the DS-TT/UE 123 may send 5GS bridge info, DS-TT port, bridge delay, and flag/indication to the SMF 224. In this case, the bridge delay is based on the TSN GM clock, and a method of indicating that the value is based on the TSN GM clock varies according to cases of (1), (2), (3) in step 1 and (1), (2)-A, (2)-B, and (3) in step 3 described above.

In step 5a, the SMF 224 may send 5GS bridge info, NW-TT port, bridge delay, and flag/indication to the PCF 227. In this case, the bridge delay is based on the TSN GM clock, and a method of indicating that the value is based on the TSN GM clock varies according to cases of (1), (2), (3) in step 1 and (1), (2)-A, (2)-B, and (3) in step 3 described above.

In step 5b, the SMF 224 may send 5GS bridge info, DS-TT port, bridge delay, and flag/indication to the PCF 227. In this case, the bridge delay is based on the TSN GM clock, and a method of indicating that the value is based on the TSN GM clock varies according to cases of (1), (2), (3) in step 1 and (1), (2)-A, (2)-B, and (3) in step 3 described above.

In step 6a, the PCF 227 may send 5GS bridge info, NW-TT port, bridge delay, and flag/indication to the TSN AF 228. In this case, the bridge delay is based on the TSN GM clock, and a method of indicating that the value is based on the TSN GM clock varies according to cases of (1), (2), (3) in step 1 and (1), (2)-A, (2)-B, and (3) in step 3 described above.

In step 6b, the PCF 227 sends 5GS bridge info, DS-TT port, bridge delay, and flag/indication to the TSN AF 228. In this case, the bridge delay is based on the TSN GM clock, and a method of indicating that the value is based on the TSN GM clock varies according to cases of (1), (2), (3) in step 1 and (1), (2)-A, (2)-B, and (3) in step 3 described above.

In step 7, the TSN AF 228 may obtain the bridge delay based on the TSN GM clock. The detailed operation differs according to cases of (1), (2)-A, (2)-B, and (3) in step 3 described above.

In case that (1) of step 3 described above is performed, the TSN AF 228 knows that the bridge delay value is based on the TSN GM clock even without flag/indication. Accordingly, the TSN AF 228 stores the received value as a bridge delay and uses the stored value so as to transmit information to the CNC 230 later.

In case that (2)-A in step 3 described above is performed, the TSN AF 228 knows that the bridge delay value is based on the TSN GM clock through a flag/indication indicating that bridge delay value is based on the TSN GM clock. Accordingly, the TSN AF 228 stores the received value(s) as a bridge delay and uses the stored value(s) so as to transmit information to the CNC 230 later.

In case that (2)-B of step 3 described above is performed, the TSN AF 228 may know that the bridge delay value is based on the TSN GM clock without a separate flag/indication. Accordingly, the TSN AF 228 stores the received value(s) as a bridge delay and uses the stored value(s) so as to transmit information to the CNC 230 later.

In case that (3) of step 3 described above is performed, the TSN AF 228 may know that the bridge delay value is based on the TSN GM clock through a flag/indication indicating that the bridge delay value is based on the TSN GM clock. Accordingly, the TSN AF 228 stores the received value(s) as a bridge delay and uses the stored value(s) so as to transmit information to the CNC later.

Step 8 is a process in which the TSN AF 228 reports the bridge delay to the CNC 230. The bridge delay transmitted in this case is a value based on the TSN GM clock.

Figure 7:
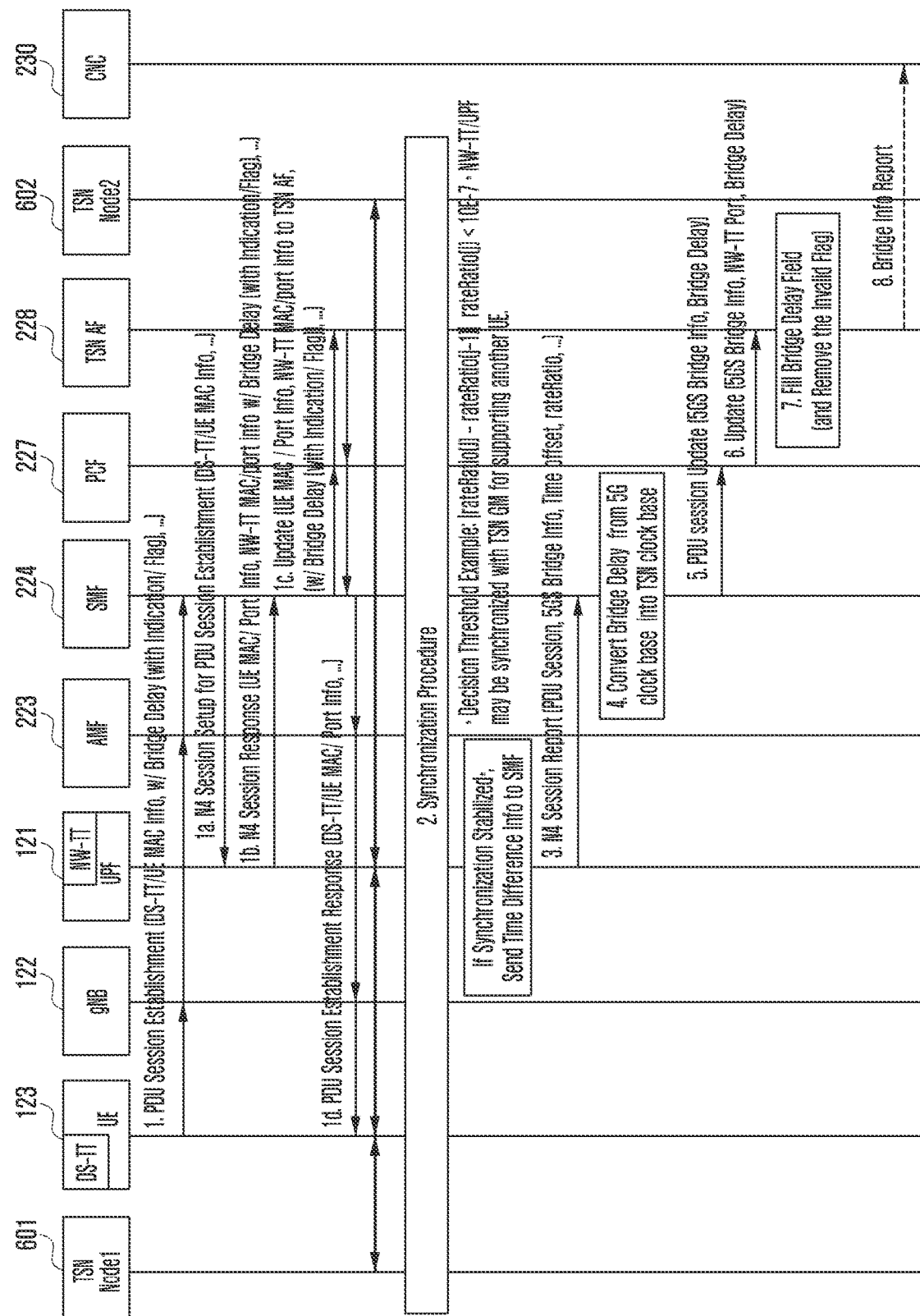
FIG. 7 is a signal flow diagram of a case that an SMF converts a bridge delay in case that a TSN AF is not a TSN synchronization client as a method 2 according to a first embodiment of the disclosure.

FIG. 7 is a signal flow diagram of a case that an SMF converts a bridge delay in case that a TSN AF is not a TSN synchronization client as a method 2 according to a first embodiment of the disclosure.

Unless TSN synchronization has already been stabilized as the NW-TT/UPF 121 performs a TSN synchronization process with a separate DS-TT/UE 123, in a process of setting up the PDU session in step 1, the DS-TT/UE 123 may transmit a DS-TT-UE residence time 301 as a bridge delay to the SMF 224. In step 1a, the SMF 224 may transmit the DS-TT/UE 123 information and the DS-TT-UE residence time 301 while requesting session setup to the NW-TT/UPF 121. In step 1b, the NW-TT/UPF 121 may include the port number assigned to the DS-TT/UE 123 and MAC/port information of the NW-TT 121b, and the PDB 302 and respond to the SMF 224. In this case, the SMF 224 may store the DS-TT-UE residence time and the PDB value as a bridge delay based on the 5GS GM. In step 1c, the SMF 224 transmits DS-TT MAC/port information, NW-TT MAC/port information, a DS-TT-UE residence time, and a PDB value as a bridge delay. In this case, the SMF 224 allocated in step 1d in which bridge delay information is transmitted in the following three methods may transmit the allocated DS-TT port information to the DS-TT/UE.

(1) Do not transmit this information.

(2) This information is transmitted, but it is indicated with a separate flag or indication that the information is based on the 5GS clock and is transmitted to the TSN AF 228.

(3) Bridge delay information is transmitted, but it may not be indicated that the bridge delay information is based on 5GS clock. The bridge delay information transmitted to the TSN AF 228 means that a default value is based on 5GS GM clock.

After performing a TSN synchronization process with a separate DS-TT/UE 123, the NW-TT/UPF 121 may have performed the PDU session establishment process of step 1 with the corresponding DS-TT/UE 123. In this case, the NW-TT/UPF 121 may have already transmitted the bridge delay based on the TSN clock in step 1. In this case, the NW-TT/UPF converts the DS-TT-UE residence time 301 received from the DS-TT/UE and the PDB 302 value thereof based on the TSN GM clock, and transmits the DS-TT-UE residence time 301 and the PDB 302 value to the TSN AF 228 via steps 1b and 1c. A method of indicating whether the transmitted bridge delay is based on the 5GS clock or the TSN clock may include a method of using a flag/indication and a method of configuring a default value based on the TSN GM clock and not sending a flag/Indication. The former corresponds to (2)-A or (3) in steps 5 and 6 to be described later, and the latter corresponds to (1) or (2)-B in steps 5 and 6 to be described later. In this case, because the TSN AF 228 secures the bridge delay based on the TSN GM clock in step 1, step 7 may be performed immediately.

A TSN synchronization frame is exchanged between the TSN and the 5GS using a user plane path formed by a PDU session in step 2, and the DS-TT/UE and the NW-TT/UPF 121 of the 5GS achieves synchronization with the TSN GM.

In step 3, when the synchronization of the TSN by the NW-TT/UPF 121 enters a stable stage, the NW-TT/UPF 121 may transmit information on a difference between the 5GS GM clock and the TSN GM clock to the SMF 224. The information largely includes time offset and rateRatio. The time offset refers to the difference between two times, and the rateRatio is a ratio of frequencies of the TSN GM clock and the local clock (5G GM clock). After TSN synchronization is stabilized through step 2, the information is transmitted.

The basis for determining whether synchronization is stabilized may be determined by referring to the basis of the TSN performance. For example, a rateRatio, which is a ratio of frequencies of the TSN GM clock and the local clock (5G GM clock), may be used. When a rateRatio value obtained by the j-th measurement is expressed with a rateRatio(j), if the rateRatio value becomes 0.1 PPM or less, it may be determined that the stabilization stage has been entered. That is, when "|rateRatio(j)−rateRatio(j−1)|/rateRatio(j)<10E-7" is satisfied, it may be determined that the stabilization stage has been entered.

In step 4, the SMF 224 converts the stored bridge delay from the basis of the 5GS GM clock to the basis of the TSN GM clock using information on a difference between the 5GS GM clock and the TSN GM clock.

In step 5, the SMF 224 transmits the bridge delay to the PCF, and in step 6, the PCF 227 transmits again the bridge delay to the TSN AF 228. There are the following operation options.

(1) If the bridge delay information is not transmitted in step 1 ((1) in step 1), the TSN AF 228 does not need to distinguish whether the information is based on the 5GS clock or the TSN clock. There is no need to include a separate flag/indication in steps 5 and 6. This is because it can be seen that a bridge delay is always transmitted to the TSN AF 228 only on the basis of the TSN GM.

(2) If the bridge delay is transmitted in step 1, but it is indicated that the bridge delay is information based on the 5GS clock and is transmitted to the TSN AF 228 ((2) in step 1), it should be specified whether a bridge delay value transmitted in steps 5 and 6 is based on the TSN clock. In this case, it may be indicated through a flag or indication that the (2)-A bridge delay value is based on the TSN clock.

Alternatively, the bridge delay value may be sent without any flag/indication, as in (2)-B. This case corresponds to a case of specifying that the bridge delay transmitted to the TSN AF 228 through the SMF 224 is a default and is based on the TSN GM clock, and if the bridge delay is not a default, the bridge delay is based on the 5GS clock. (3) If a bridge delay is transmitted in step 1, but there is no separate flag/indication that the bridge delay is information based on 5GS clock, it means that a default value of the bridge delay transmitted to the TSN AF 228 via the SMF 224 is based on the 5GS GM clock; thus, there should be a flag/indication that the bridge delay transmitted in steps 5 and 6 is based on the TSN GM clock.

In step 7, the TSN AF 228 obtains a bridge delay based on the TSN GM clock. A detailed operation thereof differs according to cases of (1), (2)-A, (2)-B, and (3) of steps 5 and 6 described above.

In case that (1) of steps 5 and 6 described above is performed, the TSN AF 228 knows that the bridge delay value is based on the TSN GM clock even without a flag/indication. Accordingly, the TSN AF 228 may store the received value as a bridge delay and use the stored value so as to transmit information to the CNC 230 later.

In case that (2)-A of steps 5 and 6 described above is performed, the TSN AF 228 knows that the bridge delay value is based on the TSN GM clock through a flag/indication indicating that the bridge delay value is based on the TSN GM clock. Therefore, the TSN AF stores the received value(s) as a bridge delay and uses the stored value(s) so as to transmit information to the CNC later.

In case that (2)-B of steps 5 and 6 described above is performed, the TSN AF 228 may know that the bridge delay value is based on the TSN GM clock without a separate flag/indication. Accordingly, the TSN AF 228 may store the received value(s) as a bridge delay and use the stored value(s) so as to transmit information to the CNC 230 later.

In case that (3) of steps 5 and 6 described above is performed, the TSN AF 228 may know that the bridge delay value is based on the TSN GM clock through a flag/indication indicating that the bridge delay value is based on the TSN GM clock. Accordingly, the TSN AF 228 may store the received value(s) as a bridge delay and use the stored value(s) so as to transmit information to the CNC later.

Step 8 is a process in which the TSN AF 228 reports the bridge delay to the CNC 230. The bridge delay transmitted in this case is a value based on the TSN GM clock.

Figure 8:
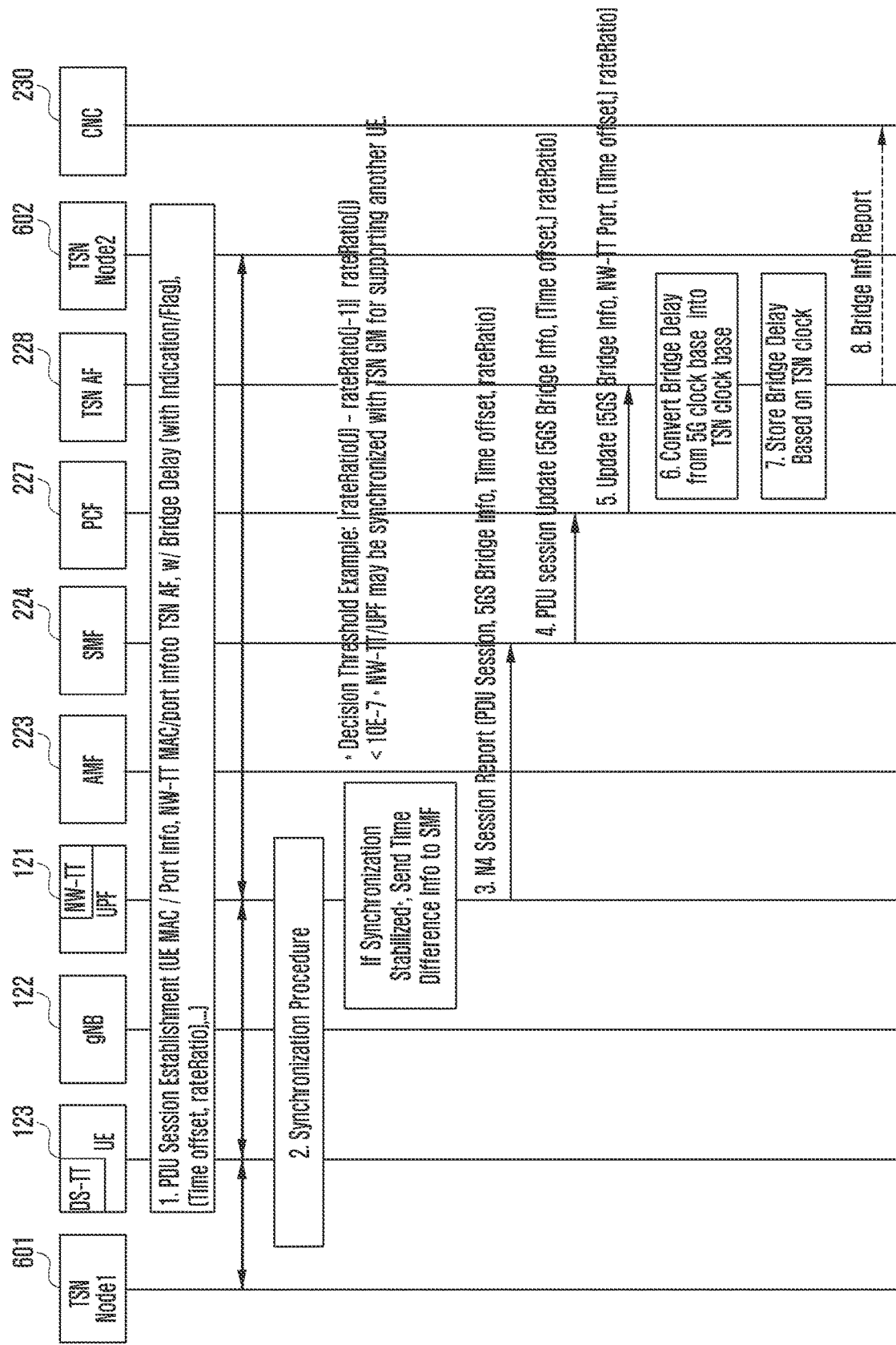
FIG. 8 is a signal flow diagram of a case that a TSN AF converts a bridge delay in case that a TSN AF is not a TSN synchronization client as a method 3 of a first embodiment of the disclosure.

FIG. 8 is a signal flow diagram of a case that a TSN AF converts a bridge delay in case that a TSN AF is not a TSN synchronization client as a method 3 of a first embodiment of the disclosure.

Unless TSN synchronization has already been stabilized as the NW-TT/UPF 121 performs a TSN synchronization process with a separate DS-TT/UE 123, in a process of setting up the PDU session in step 1, the DS-TT/UE 123 and the NW-TT/UPF 121 may transmit bridge delay information to the TSN AF 228. In this case, a value transmitted by the DS-TT/UE 123 is the DS-TT-UE residence time 301, and a value transmitted by the NW-TT/UPF 121 is a value of the PDB 302. However, because this information is based on the 5GS, the information should be displayed and there are two operation options below.

(1) This information is transmitted, but it is indicated with a separate flag or indication that the information is based on the 5GS clock and is transmitted to the TSN AF 228.

(2) Bridge delay information is transmitted, but it may not be indicated that the bridge delay information is based on the 5GS clock. The bridge delay information transmitted to the TSN AF 228 means that a default value is based on 5GS GM clock.

Here, the bridge delay includes the DS-TT-UE residence time 301 transmitted by the DS-TT/UE 123 and the PDB 302 value transmitted by the NW-TT/UPF 121, as in FIG. 3 described above, and it is described without distinguishing the information transmitted by the UE and the information transmitted by the UPF. Therefore, each of the DS-TT-UE residence time 301 and the PDB 302 may use one of the methods 1 and 2.

After separately performing a TSN synchronization process with the DS-TT/UE 123, the NW-TT/UPF 121 may have performed the PDU session establishment process of step 1 with the corresponding DS-TT/UE 123. In this case, the NW-TT/UPF 121 may transmit information on a difference between the 5GS GM clock and the TSN GM clock as well as the bridge delay in step 1 to the TSN AF 228. Information on a difference between the 5GS GM clock and the TSN GM clock may include time offset and rateRatio. The time offset refers to the difference between two times, and the rateRatio is a ratio of frequencies of the TSN GM clock and the local clock (5G GM clock). In case that the NW-TT/UPF 121 has already achieved TSN synchronization by performing a TSN synchronization process with a separate DS-TT/UE 123, step 6 may be performed immediately after step 1.

A TSN synchronization frame is exchanged between the TSN and the 5GS using a user plane path formed by a PDU session in step 2, and the DS-TT/UE 123 and the NW-TT/UPF 121 of the 5GS achieve synchronization with the TSN GM.

In step 3, when synchronization of the TSN by the NW-TT/UPF 121 enters a stable stage, the NW-TT/UPF 121 may transmit information on a difference between the 5GS GM clock and the TSN GM clock to the SMF 224. The information may include time offset and rateRatio. The time offset refers to the difference between two times, and the rateRatio is a ratio of frequencies of the TSN GM clock and the local clock (5G GM clock). After TSN synchronization is stabilized through step 2, the NW-TT/UPF 121 may transmit the information to the SMF 224.

The basis for determining whether synchronization has been stabilized may be determined by referring to the basis of the TSN performance. For example, a rateRatio, which is a ratio of frequencies of the TSN GM clock and the local clock (5G GM clock), may be used. When a rateRatio value obtained by the j-th measurement is expressed with a rateRatio(j), if the rateRatio value becomes 0.1 PPM or less, it may be determined that the stabilization stage has been entered. That is, when "|rateRatio(j)−rateRatio(j−1)|/rateRatio(j)<10E-7" is satisfied, it may be determined that the stabilization stage has been entered.

In step 4, the SMF 224 may transmit information on a difference between the 5GS GM clock and the TSN GM clock to the PCF 227, and in step 5, the PCF 227 may transmit the information back to the TSN AF 228. Among information on a difference between the two clocks, time offset information is not used for converting the bridge delay from the basis of the 5GS GM clock to the basis of the TSN GM clock, so that steps 4 and 5 may include only rateRatio.

In step 6, the TSN AF 228 may convert the bridge delay from the basis of the 5GS GM clock to the basis of the TSN GM clock. In this case, because the bridge delay is a value that indicates a length of the time, not the time, the bridge delay may be converted by using only rateRatio information among information on a difference between the two clocks.

In step 7, the bridge delay based on the TSN clock may be stored. Bridge delay information based on the 5GS clock may be stored to recalculate the bridge delay based on the TSN clock when information on a difference between the 5GS GM clock and the TSN GM clock is updated and transmitted. In FIG. 8, step 7 is exemplified before step 8, but step 7 may be performed after step 8.

Step 8 is a process in which the TSN AF 228 reports the bridge delay to the CNC 230. The bridge delay transmitted in this case may be a value based on the TSN GM clock.

Method 4 will be further described with reference to FIG. 8. Unless TSN synchronization has already been stabilized as the NW-TT/UPF 121 performs a TSN synchronization process with a separate DS-TT/UE 123, in a process of setting up the PDU session in step 1, the DS-TT/UE 123 and the NW-TT/UPF 121 may transmit bridge delay information to the TSN AF 228. In this case, a value transmitted by the DS-TT/UE 123 is a DS-TT-UE residence time 301, and a value transmitted by the NW-TT/UPF 121 is a value of the PDB 302. In this case, the PCF 227 may be positioned on a path in which the bridge delay information is transmitted to the TSN AF 228. That is, as described above with reference to FIG. 4, the DS-TT/UE 123 may transmit the DS-TT-UE residence time 301 to the SMF 224 through the gNB 122 and the AMF 223. Further, the NW-TT/UPF 121 may transmit the PDB 302 value to the SMF 224, as described with reference to FIG. 4.

In response to this, the SMF 224 transmits the DS-TT-UE residence time 301 and a PDB 302 value to the TSN AF 228 through the PCF 227. Accordingly, the PCF 227 may receive and store both the DS-TT-UE residence time 301 and the PDB 302 value.

Further, as described in the method 3, because the information is based on 5GS, it should be displayed and the following two operation options may be possible.

(1) This information is transmitted, but it is indicated with a separate flag or indication that the information is based on the 5GS clock and is transmitted to the TSN AF 228.

(2) Bridge delay information is transmitted, but it may not be indicated that bridge delay information is based on 5GS clock. The bridge delay information transmitted to the TSN AF 228 means that a default value is based on 5GS GM clock.

After performing a TSN synchronization process with a separate DS-TT/UE 123, the NW-TT/UPF 121 may have performed a PDU session establishment process of step 1 with the corresponding DS-TT/UE 123. In this case, the NW-TT/UPF 121 may transmit information on a difference between the 5GS GM clock and the TSN GM clock as well as the bridge delay in step 1 to the TSN AF 228. Even in this case, information on a difference between the 5GS GM clock and the TSN GM clock as well as the bridge delay may be provided through the PCF 227. Therefore, the PCF 227 may receive and store information on a difference between the 5GS GM clock and the TSN GM clock as well as the bridge delay.

Information on a difference between the 5GS GM clock and the TSN GM clock may include time offset and rateRatio. The time offset refers to the difference between two times, and the rateRatio is a ratio of frequencies of the TSN GM clock and the local clock (5G GM clock).

In case that TSN synchronization has been already achieved as the NW-TT/UPF 121 performs a TSN synchronization process with a separate DS-TT/UE 123, the PCF 227 may perform an operation of step 6 of FIG. 8 after step 1. For example, the PCF 227 may convert the bridge delay from the basis of the 5GS GM clock to the basis of the TSN GM clock. In this case, because the bridge delay is a value that indicates a length of the time, not the time, the bridge delay may be converted by using only rateRatio information among information on a difference between two clocks.

Thereafter, the PCF 227 may perform the operation of step 7 of FIG. 8. For example, the PCF 227 may store a bridge delay based on the TSN clock. Bridge delay information based on the 5GS clock may be stored to recalculate the bridge delay based on the TSN clock when information on a difference between the 5GS GM clock and the TSN GM clock is updated and transmitted.

The PCF 227 may configure this information with an update message and provide the information to the TSN AF 228, as in step 5 of FIG. 8. Accordingly, the TSN AF 228 may store the information received from the PCF 227 and transmit the information to the CNC 230, as in step 8.

Steps 2, 3, and 4 described above with reference to FIG. 8 may be performed in the same manner as that described with reference to FIG. 8. However, in case that the method 4 is used, operations of steps 6 and 7 performed in the TSN AF 228 may be performed in the PCF 227, and then step 5 may be performed.

The TSN AF 228 may perform an operation of storing the information provided in step 5 as in step 7 and perform step 8.

Figure 9:
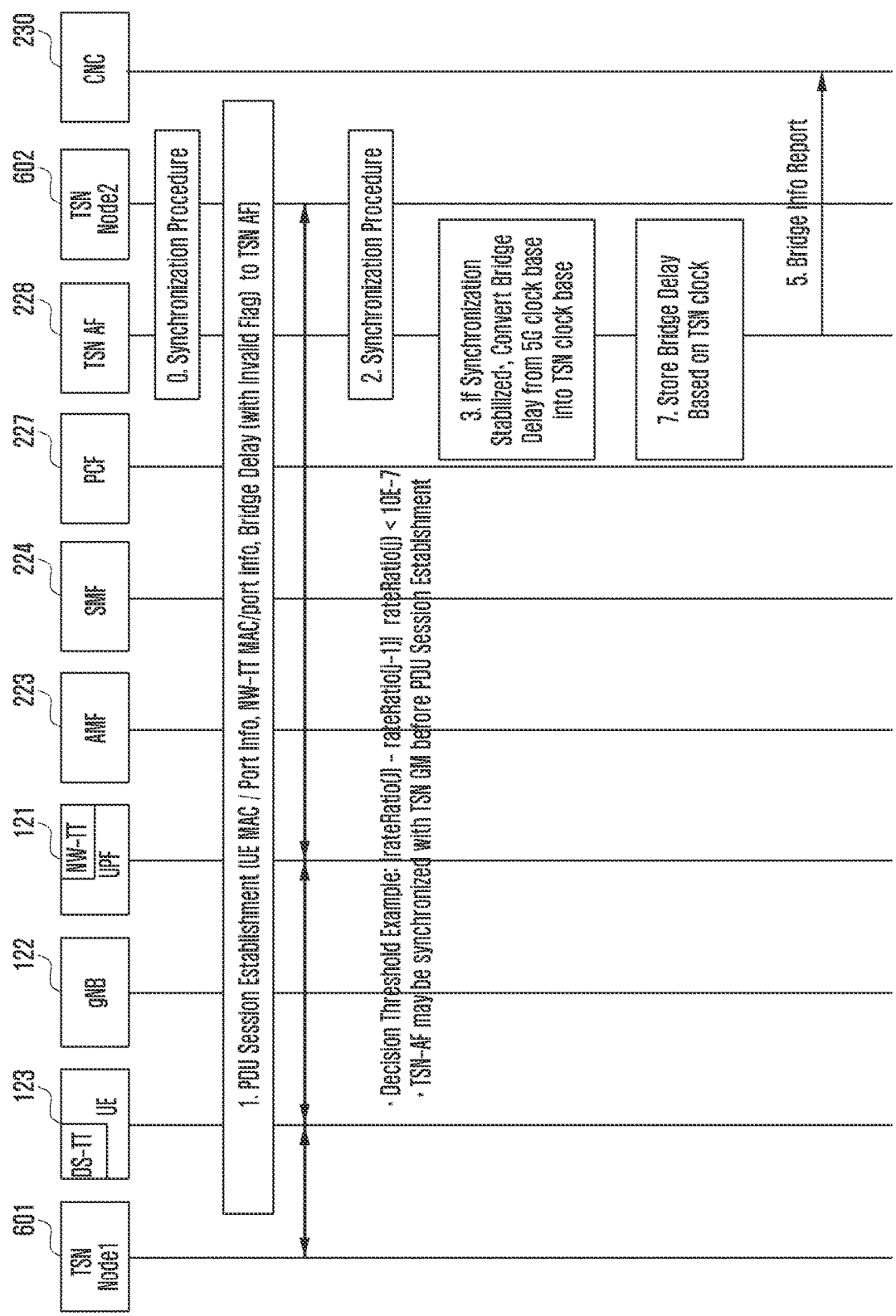
FIG. 9 is a signal flow diagram when a TSN AF converts a bridge delay in case that a TSN AF is a TSN synchronization client according to a second embodiment of the disclosure.

FIG. 9 is a signal flow diagram when a TSN AF converts a bridge delay in case that a TSN AF is a TSN synchronization client according to a second embodiment of the disclosure.

In a process of setting up the PDU session in step 1, the DS-TT/UE 123 and the NW-TT/UPF 121 may transmit bridge delay information to the TSN AF 228. In this case, a value transmitted by the DS-TT/UE 123 is a DS-TT-UE residence time 301, and a value transmitted by the NW-TT/UPF 121 is a value of the PDB 302. However, because this information is based on the 5GS, one method of the following options may be used.

(1) This information is transmitted, but it is indicated with a separate flag or indication that the information is based on the 5GS clock and is transmitted to the TSN AF 228.

(2) Bridge delay information is transmitted, but it may not be indicated that bridge delay information is based on 5GS clock. The bridge delay information transmitted to the TSN AF 228 means that a default value is based on 5GS GM clock.

Before PDU session setup between the NW-TT/UPF 121 and the DS-TT/UE 123, which is step 1, the TSN AF 228 may perform a TSN synchronization process to know information on a difference between the 5GS GM clock and the TSN GM clock. Information on a difference between the 5GS GM clock and the TSN GM clock may include time offset and rateRatio. The time offset refers to the difference between two times, and the rateRatio is a ratio of frequencies of the TSN GM clock and the local clock (5G GM clock). In this case, step 3 may be performed immediately after step 1.

In step 2, the TSN AF 228 performs a TSN synchronization process to obtain the TSN GM clock and synchronization.

In step 3, the TSN AF 228 converts the bridge delay from the basis of the 5GS GM clock to the basis of the TSN GM clock. In this case, because the bridge delay is a value that indicates a length of time, not the time, the bridge delay may be converted by using only rateRatio information among information on a difference between the two clocks.

In step 4, the TSN AF 228 may store a bridge delay based on the TSN clock. Bridge delay information based on the 5GS clock may be stored to recalculate the bridge delay based on the TSN clock when information on a difference between the 5GS GM clock and the TSN GM clock is updated and transmitted.

Step 5 is a process in which the TSN AF 228 reports a bridge delay to the CNC 230. The bridge delay transmitted in this case may be a value based on the TSN GM clock.

Figure 10:
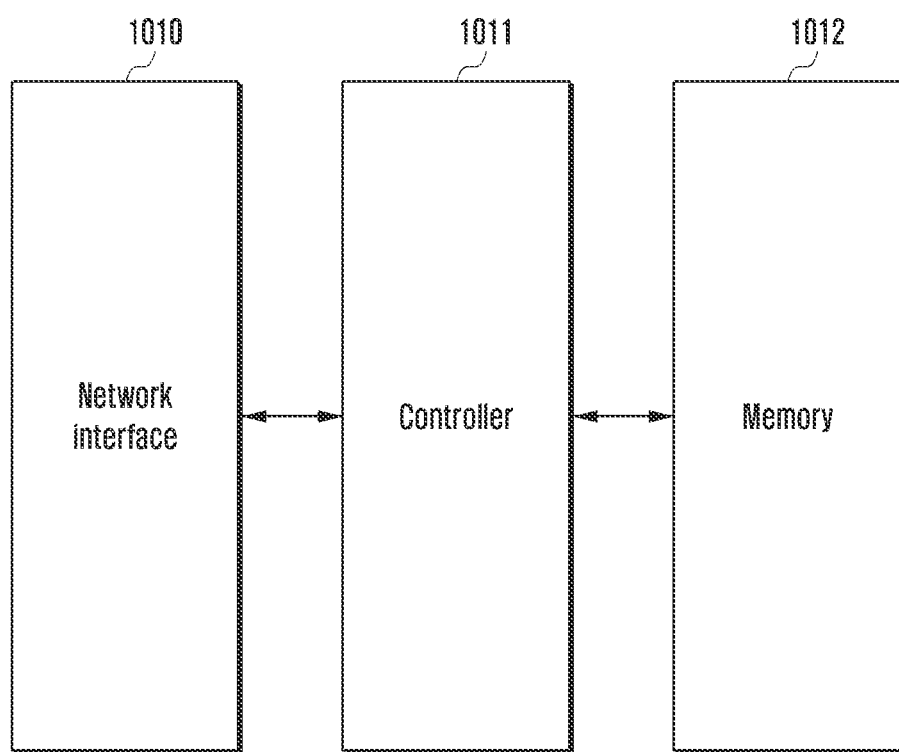
FIG. 10 is a block diagram illustrating a function of an NF of a wireless communication network according to an embodiment of the disclosure.

FIG. 10 is a block diagram illustrating a function of an NF of a wireless communication network according to an embodiment of the disclosure.

With reference to FIG. 10, a network interface 1010 may communicate with at least one TSN node and/or other network entities of a mobile communication core network. For example, in case that the NF is the RAN 122, the NF may perform communication with the UPF 121, the AMF 223, and the like. As another example, in case that the NF is the UPF 121, the NF may perform communication with the RAN 122, the SMF 224, and the like. As another example, in case that the NF is the TSN AF 228, the NF may perform communication with the CNC 230 of the TSN and/or at least one node of the TSN system, and simultaneously communicate with the NEF 229 and/or the PCF 227. Similarly, in case that the NF is one specific network entity, the network interface 1010 may communicate with another entity of the mobile communication network and/or at least one node of the TSN system. Accordingly, the network interface 1010 according to the disclosure may include a function of NW-TT in a specific case, for example, in case that the network interface 1010 is included in the UPF 326.

The controller 1011 may be implemented into at least one processor and/or a program for performing an NF operation. For example, in case that the NF is the UPF 121, the controller 1011 may perform the above-described operation of the UFF 121. As another example, in case that the NF is the TSN AF 228, the NF may perform the above-described operation of the TSN AF 228. Other network entities may perform the control necessary for the above-described operations in the same manner.

The memory 1012 may store a program and various control information required by the controller 1011, and store each information described in the disclosure.

In addition to the configuration described above, the NF may further include various interfaces for access with an operator. In the disclosure, there is no particular limitation on such an additional configuration.

Figure 11:
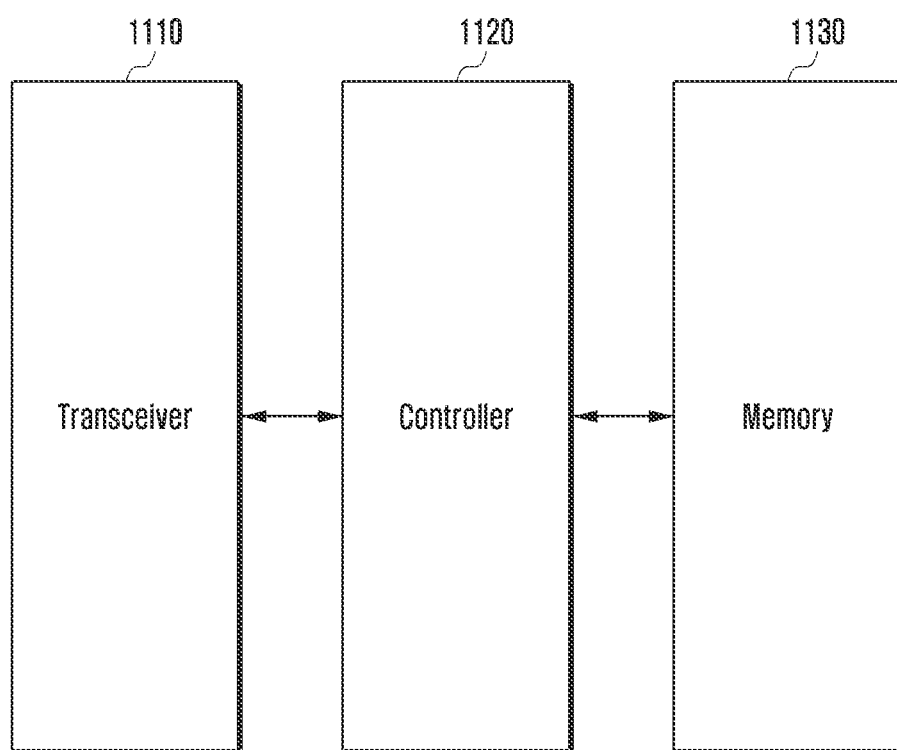
FIG. 11 is a block diagram illustrating an internal functional block of a terminal according to various embodiments of the disclosure.

FIG. 11 is a block diagram illustrating an internal function of a UE according to various embodiments of the disclosure.

With reference to FIG. 11, a UE 123 may include a transceiver 1110, a controller 1120, and a memory 1130. The UE 123 may additionally have more components according to an implementation method. For example, the UE 123 may further include various additional devices such as a display for a user interface, an input unit, and a sensor. In the disclosure, no restrictions are placed on such an additional configuration.

The transceiver 1110 may be connected to the gNB 122 through a wireless channel based on each of the embodiments described in FIGS. 1 to 9, and transmit and receive signals and/or messages to and from the gNB 122. In case that the UE 123 communicates with the 5G network, the transceiver 1110 may be a device capable of transmitting and receiving signals and/or messages to and from the 5G communication network. Further, the transceiver 1110 may include a communication processor as necessary. In case that the transceiver 1110 does not include a communication processor, all signals and/or messages may be processed by the controller.

Further, according to the disclosure, the transceiver 1110 may communicate with at least one node of the TSN system. In this case, at least one node of the TSN system may be one of a talker and/or a listener or another bridge, as described above. Therefore, the transceiver 1110 according to the disclosure may include both a configuration for communicating with a mobile communication system in a wireless format and a configuration for DS-TT.

The controller 1120 may control a basic operation of the UE 123, and control reception, delivery, transmission, and storage of the messages described above.

The memory 1130 may store various data necessary for the control of the UE 123, and have an area for storing a message received from a specific NF of the core network and/or the gNB 122 in order to communicate using the network slice described above.

Methods according to the embodiments described in the claims or specifications of the disclosure may be implemented in the form of hardware, software, or a combination of hardware and software.

When implemented in software, a computer readable storage medium storing one or more programs (software modules) may be provided. One or more programs stored in the computer readable storage medium are configured for execution by one or more processors in an electronic device. The one or more programs include instructions for causing an electronic device to execute methods according to embodiments described in a claim or specification of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), any other form of optical storage device, or a magnetic cassette. Alternatively, the programs may be stored in a memory configured with a combination of some or all thereof. Further, each configuration memory may be included in the plural.

Further, the program may be stored in an attachable storage device that may access through a communication network such as the Internet, Intranet, local area network (LAN), wide LAN (WLAN), or storage area Network (SAN), or a communication network configured with a combination thereof. Such a storage device may access to a device implementing an embodiment of the disclosure through an external port. Further, a separate storage device on a communication network may access a device implementing the embodiment of the disclosure.

In the specific embodiments of the disclosure described above, elements included in the disclosure are expressed in the singular or plural according to the specific embodiments presented. However, the singular or plural expression is appropriately selected for a situation presented for convenience of description, and the disclosure is not limited to the singular or plural components, and even if a component is represented in the plural, it may be configured with the singular, or even if a component is represented in the singular, it may be configured with the plural.

INDUSTRIAL APPLICABILITY

The disclosure is applicable to a case that a mobile communication system operates as one node of a TSN network.

What is claimed is:

1. A method for reporting a delay time of a mobile communication system to a time sensitive networking (TSN) server in a device-side TSN translator (DS-TT)/user equipment (UE) of a mobile communication system, the method comprising:
   transmitting, to a TSN application function (AF) device, bridge delay related information based on a TSN grand master (GM) clock;
   updating the bridge delay related information based on the TSN GM clock; and
   transmitting, to the TSN AF device, the updated bridge delay related information,
   wherein a protocol data unit (PDU) session establishment message including the bridge delay related information is transmitted to a network-side TSN translator (NW-TT).

2. The method of claim 1, wherein the bridge delay related information and the updated bridge delay related information are transmitted to the TSN AF device via a session management function (SMF).

3. The method of claim 2, wherein a N4 message including the bridge delay related information is transmitted to the SMF from the NW-TT.

4. A method for reporting a delay time of a mobile communication system to a time sensitive networking (TSN) server in a TSN application function device of a mobile communication system, the method comprising:
   receiving, from at least one of a network-side TSN translator (NW-TT) or a device-side TSN translator (DS-TT), bridge delay related information;
   transmitting, to a centralized network configuration (CNC) server, the bridge delay related information;
   receiving, from at least one of the NW-TT or the DS-TT, updated bridge delay related information; and
   transmitting, to the CNC server, the updated bridge delay related information,
   wherein the bridge delay related information and the updated bridge delay related information are based on a TSN grand master (GM) clock.

5. The method of claim 4, wherein the bridge delay related information is received from the NW-TT via a SMF.

6. The method of claim 5, wherein a N4 message including the bridge delay related information is transmitted to the SMF from the NW-TT.

7. The method of claim 6, wherein the bridge delay related information is received from the DS-TT via a SMF.

8. The method of claim 7, wherein a PDU session modification message including the updated bridge delay related information is transmitted to the SMF from the DS-TT.

9. A device-side TSN translator (DS-TT)/user equipment (UE) reporting a delay time of a mobile communication system to a time sensitive networking (TSN) server in a mobile communication system, the DS-TT/UE comprising:
   a network interface; and
   a controller electrically coupled to the network interface, wherein the controller is configured to:
      transmit, to a TSN application function (AF) device, bridge delay related information based on a TSN grand master (GM) clock,
      update the bridge delay related information based on the TSN GM clock and
      transmit, to the TSN AF device, the updated bridge delay related information,
   wherein a protocol data unit (PDU) session establishment message including the bridge delay related information is transmitted to a network-side TSN translator (NW-TT).

10. The DS-TT/UE of claim 9, wherein the bridge delay related information and the updated bridge delay related information are transmitted to a TSN application function (AF) device via a session management function (SMF).

11. The DS-TT/UE of claim 10, wherein a N4 message including the bridge delay related information is transmitted to the SMF from the NW-TT.

12. A TSN application function (AF) device reporting a delay time of a mobile communication system to a time sensitive networking (TSN) server in a mobile communication system, the TSN AF device comprising:
   a network interface; and
   a controller electrically coupled to the network interface, wherein the controller is configured to:
      receive, from at least one of a network-side TSN translator (NW-TT) or a device-side TSN translator (DS-TT), bridge delay related information,
      transmit, to a centralized network configuration (CNC) server, the bridge delay related information,
      receive, from at least one of the NW-TT or the DS-TT, updated bridge delay related information; and
      transmit, to the CNC server, the updated bridge delay related information,
   wherein the bridge delay related information and the updated bridge delay related information are based on a TSN grand master (GM) clock.

13. The TSN AF device of claim 12, wherein the bridge delay related information is received from the NW-TT via a SMF.

14. The TSN AF device of claim 13, wherein a N4 message including the bridge delay related information is transmitted to the SMF from the NW-TT.

15. The TSN AF device of claim 14, wherein the bridge delay related information is received from the DS-TT via a SMF.

16. The TSN AF device of claim 15, wherein a protocol data unit (PDU) session modification message including the updated bridge delay related information is transmitted to the SMF from the DS-TT.

* * * * *